US011283891B2

(12) United States Patent
Jung et al.

(10) Patent No.: US 11,283,891 B2
(45) Date of Patent: Mar. 22, 2022

(54) ELECTRONIC DEVICE AND METHOD FOR SYNCHRONIZING CALL LOGS

(71) Applicant: Samsung Electronics Co., Ltd., Suwon-si (KR)

(72) Inventors: Baeeun Jung, Suwon-si (KR); Venkatesh Gowni Ramakrishna, Bangalore (IN); Rohit Bendre, Bangalore (IN); Killyeon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/536,171

(22) Filed: Aug. 8, 2019

(65) Prior Publication Data
US 2020/0053179 A1  Feb. 13, 2020

(30) Foreign Application Priority Data

Aug. 8, 2018  (KR) .......................... 10-2018-0092467

(51) Int. Cl.
*H04L 29/08* (2006.01)
*H04M 3/42* (2006.01)
*H04L 67/55* (2022.01)

(52) U.S. Cl.
CPC ........ *H04L 67/26* (2013.01); *H04M 3/42263* (2013.01); *H04M 2250/60* (2013.01)

(58) Field of Classification Search
CPC .............. H04L 67/26; H04M 3/42263; H04M 2250/60
See application file for complete search history.

(56) References Cited

U.S. PATENT DOCUMENTS 7,839,987 B1 * 11/2010 Kirchhoff ............. H04M 1/575
379/142.02
9,942,322 B1 * 4/2018 Reddy ................... H04L 67/141
(Continued)

FOREIGN PATENT DOCUMENTS

JP       2007-281683 A    10/2007
KR  10-2006-0112895 A    11/2006
(Continued)

OTHER PUBLICATIONS

International Search Report dated Nov. 8, 2019 in connection with International Patent Application No. PCT/KR2019/009577, 3 pages.
(Continued)

*Primary Examiner* — Uzma Alam

(57) ABSTRACT

A plurality of electronic devices can share a single phone number with each other. One of the electronic devices includes a display, a communication circuit, a processor operatively connected to the display and the communication circuit, and a memory operatively connected to the processor and configured to store a plurality of call logs. The memory stores instructions causing, when executed, the processor to receive a call request via the phone number, to transmit a first call log associated with a missed call to a server in response to a stopped reception of the call request, to receive a first response signal regarding transmission of the first call log from the server, to store the first call log in the memory, based on the first response signal, to receive a push signal from the server, and to update the first call log stored in the memory, based on the push signal.

20 Claims, 14 Drawing Sheets

(56) References Cited

U.S. PATENT DOCUMENTS

| | | | | |
|---|---|---|---|---|
| 10,333,998 B1* | 6/2019 | Chiu | ................. | G10L 15/26 |
| 2008/0175358 A1* | 7/2008 | Huang | ................. | H04M 1/56 |
| | | | | 379/93.01 |
| 2010/0138516 A1* | 6/2010 | Oh | ................. | H04L 65/4015 |
| | | | | 709/217 |
| 2010/0290606 A1* | 11/2010 | Ramanathan | ..... | H04M 15/8228 |
| | | | | 379/112.01 |
| 2012/0005152 A1* | 1/2012 | Westen | ................. | G06F 16/958 |
| | | | | 707/602 |
| 2015/0222744 A1* | 8/2015 | Azim | ................. | H04M 3/2218 |
| | | | | 379/140 |
| 2016/0036476 A1* | 2/2016 | Cho | ................. | H04M 3/42238 |
| | | | | 455/558 |
| 2017/0171384 A1* | 6/2017 | Ghuli | ................. | H04M 3/42059 |
| 2017/0230499 A1* | 8/2017 | Mumick | ................. | H04W 4/12 |

FOREIGN PATENT DOCUMENTS

| | | | | |
|---|---|---|---|---|
| KR | 10-2007-0055237 A | | 5/2007 | |
| WO | WO-0106740 A2 * | | 1/2001 | ........ H04M 3/42314 |
| WO | WO-2006058815 A1 * | | 6/2006 | .......... H04M 3/2218 |
| WO | WO-2009033516 A1 * | | 3/2009 | ........ H04L 65/1069 |
| WO | WO-2017153457 A1 * | | 9/2017 | .......... H04L 65/403 |

OTHER PUBLICATIONS

Written Opinion of the International Searching Authority dated Nov. 8, 2019 in connection with International Patent Application No. PCT/KR2019/009577, 6 pages.

* cited by examiner

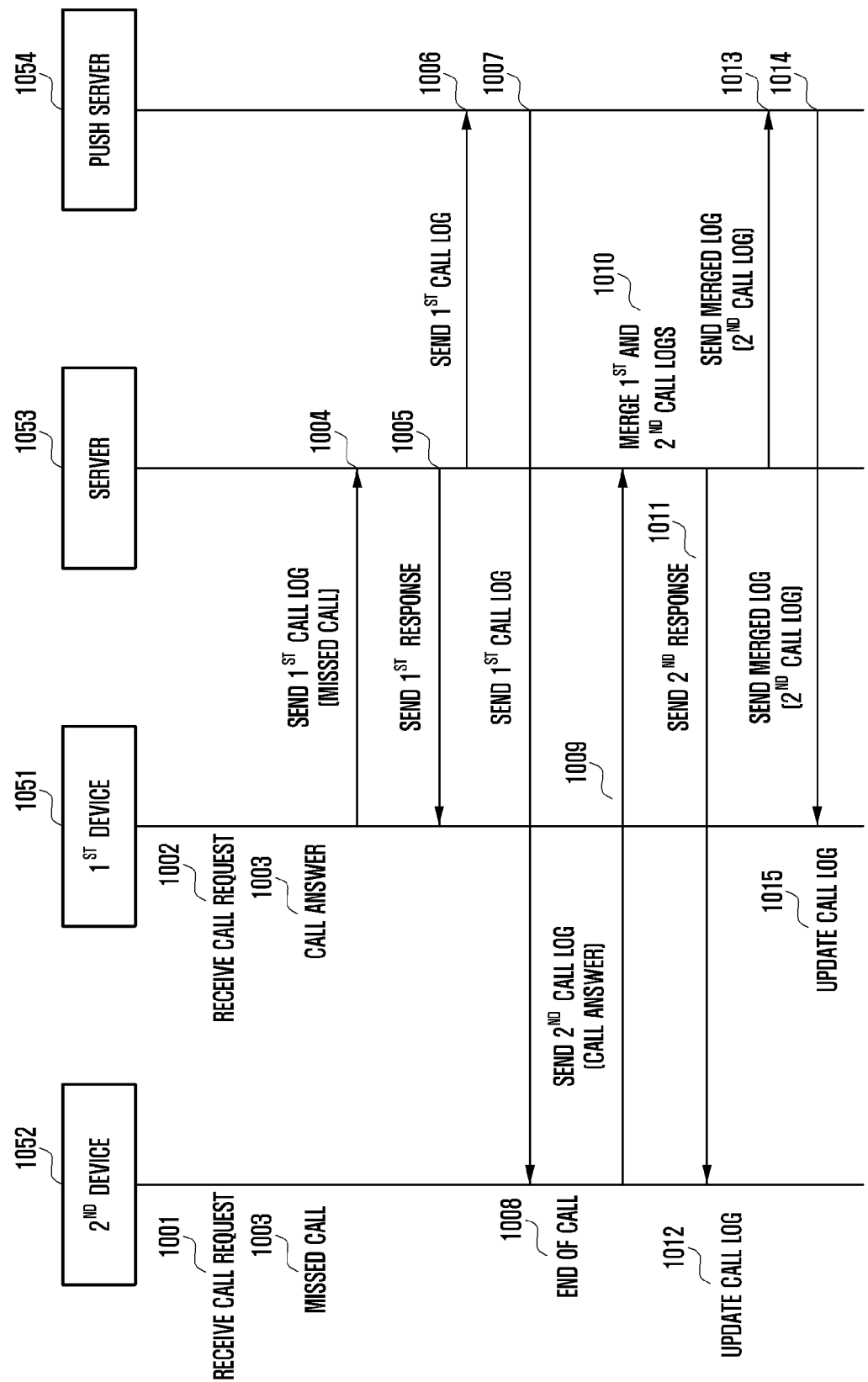

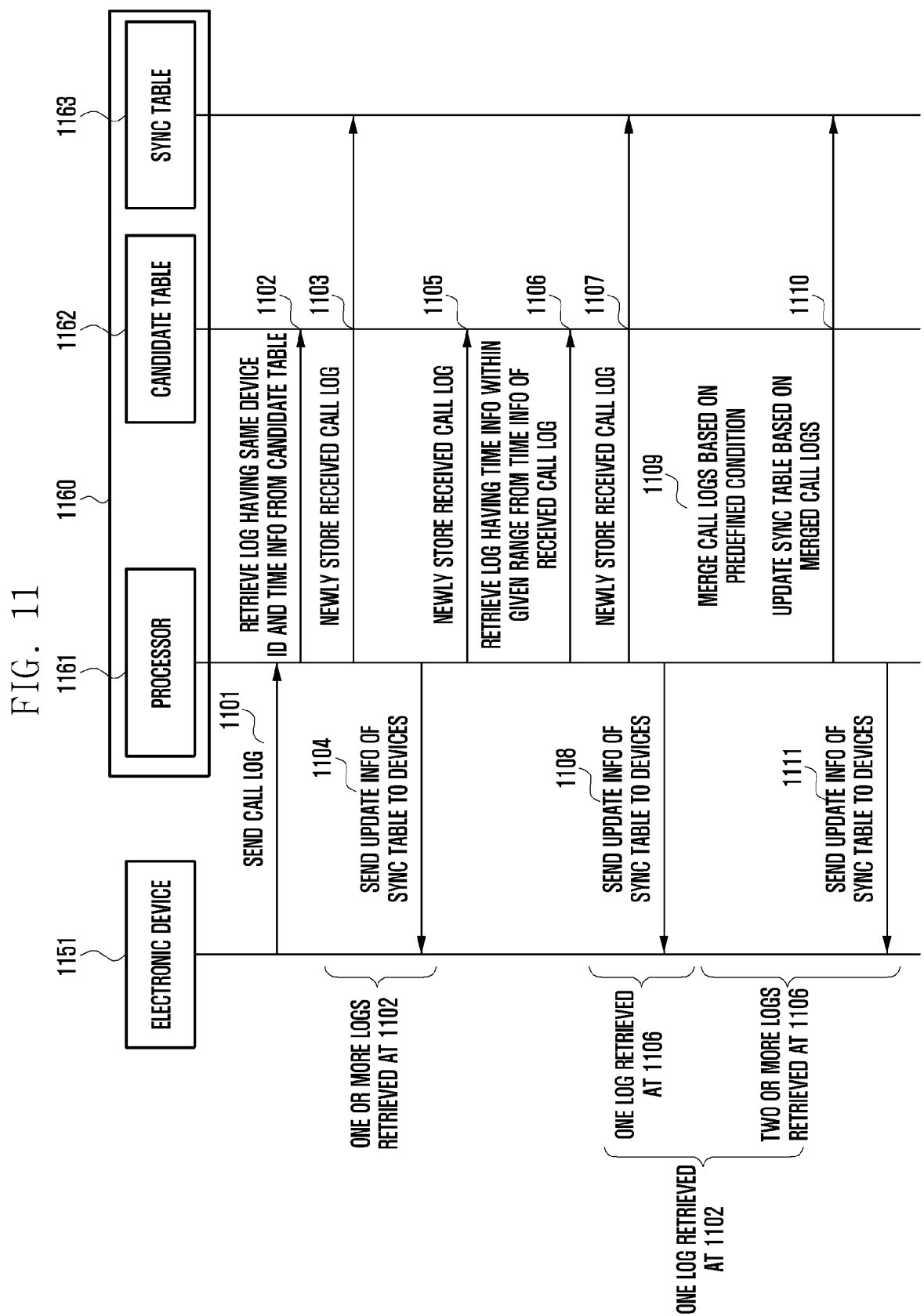

ELECTRONIC DEVICE AND METHOD FOR SYNCHRONIZING CALL LOGS

CROSS-REFERENCE TO RELATED APPLICATIONS

This application is based on and claims priority under 35 U.S.C. 119 to Korean Patent Application No. 10-2018-0092467, filed on Aug. 8, 2018, in the Korean Intellectual Property Office, the disclosures of which are herein incorporated by reference in their entireties.

TECHNICAL FIELD

The disclosure relates to a technique allowing a plurality of electronic devices to receive or transmit phone calls using a single phone number.

BACKGROUND

In recent years, a technique that allows a plurality of electronic devices to receive or transmit phone calls using a single phone number has been introduced. For example, a smart phone and a smart watch can share one phone number and receive or transmit a phone call via the shared phone number.

Even if a user has two or more electronic devices that share a single phone number and are able to perform a call function, only one of the electronic devices is used during an actual call. Thus, for example, when the user receives a call using the first electronic device, an incoming call log is stored in the first electronic device only, whereas the second electronic device stores a missed call log. That is, although sharing the same phone number, the first and second electronic devices store different call logs.

SUMMARY

Various embodiments of the disclosure provide a technique to synchronize call logs between two or more electronic devices that share a single phone number. This can enhance user convenience.

According to various embodiments of the disclosure, an electronic device configured to share a single phone number with an external device may include a display, a communication circuit, a processor operatively connected to the display and the communication circuit, and a memory operatively connected to the processor and configured to store a plurality of call logs. The memory may store instructions causing, when executed, the processor to receive a call request via the phone number, to transmit a first call log associated with a missed call to a server in response to a stopped reception of the call request, to receive a first response signal regarding transmission of the first call log from the server, to store the first call log in the memory, based on the first response signal, to receive a push signal from the server, wherein the push signal is generated by the server, based on a second call log received from the external device and generated by the external device based on the call request, and to update the first call log stored in the memory, based on the push signal.

According to various embodiments of the disclosure, a server for synchronizing call logs of a plurality of electronic devices configured to share a single phone number may include a memory including a table storing a plurality of call logs, and a processor. The processor may be configured to receive a call log associated with the phone number from one of the plurality of electronic devices, to determine whether the received call log has a correlation with the plurality of call logs stored in the table, to when the received call log has the correlation, merge the received call log with the stored call logs of the table, based on a predefined condition, so as to update the stored call logs of the table, based on a merge result, to when the received call log has no correlation, newly store the received call log in the table so as to update the stored call logs of the table, and to transmit an update result of the table to the plurality of electronic devices.

According to various embodiments of the disclosure, an operating method of an electronic device configured to share a single phone number with an external device may include receiving a call request via the phone number; transmitting a first call log associated with a missed call to a server in response to a stopped reception of the call request; receiving a first response signal regarding transmission of the first call log from the server; storing the first call log in a memory of the electronic device, based on the first response signal; receiving a push signal from the server, wherein the push signal is generated by the server, based on a second call log received from the external device and generated by the external device based on the call request; and changing the first call log stored in the memory to the second call log, based on the push signal.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 10 is a flow diagram illustrating operations of overall components in a system according to an embodiment of the disclosure.

FIG. 11 is a flow diagram illustrating operations of a server according to an embodiment of the disclosure.

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the disclosure will be described in detail with reference to accompanying drawings.

Figure 1:
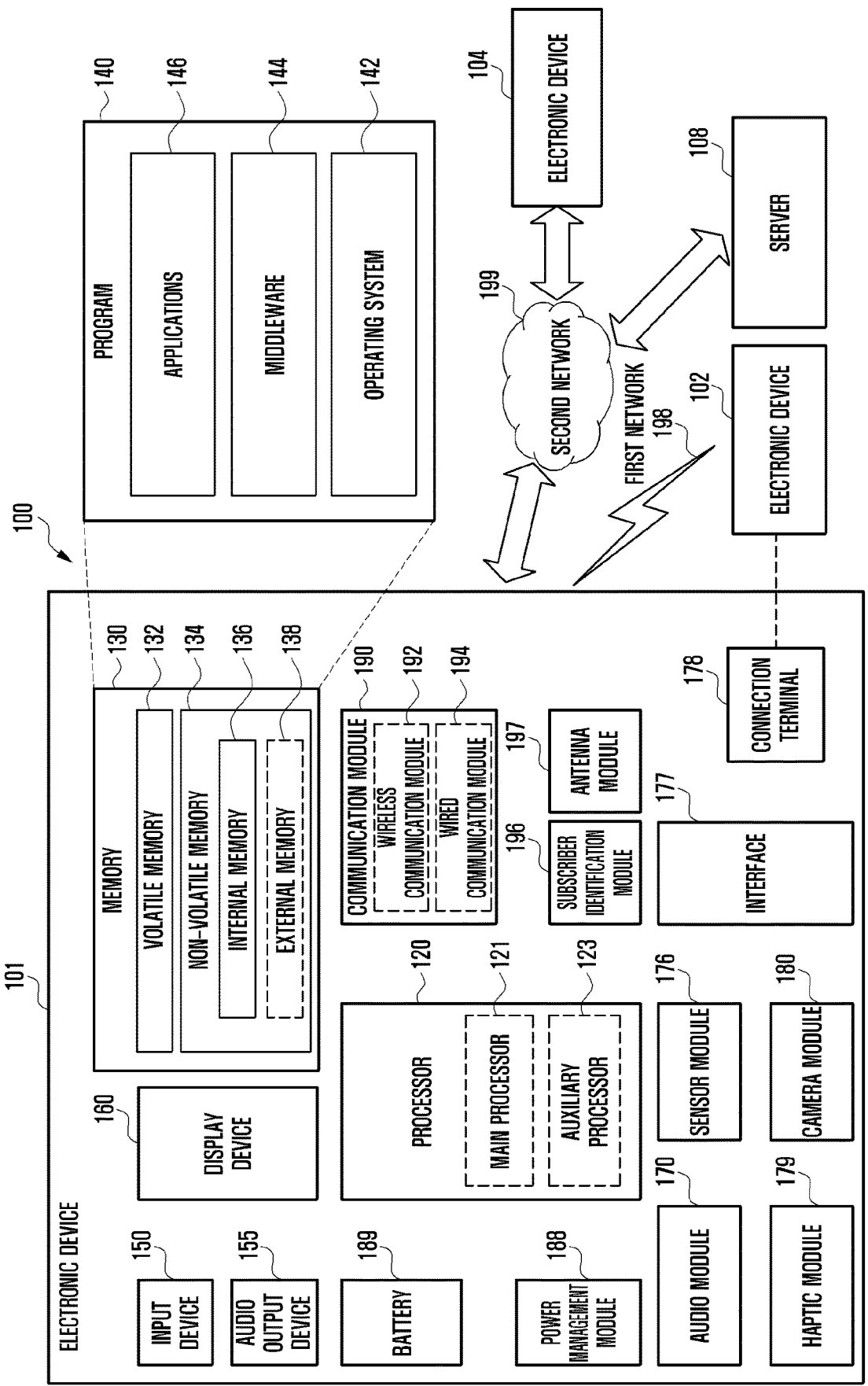
FIG. 1 is a block diagram illustrating an electronic device in a network environment according to various embodiments of the disclosure.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi™) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

According to various embodiments of the disclosure, an electronic device may include a display (e.g., the display device 160 in FIG. 1), a communication circuit (e.g., the communication module 190 in FIG. 1), a processor (e.g., the processor 120 in FIG. 1) operatively connected to the display 160 and the communication circuit 190, and a memory (e.g., the memory 130 in FIG. 1) operatively connected to the processor 120 and configured to store a plurality of call logs. The memory 130 may store instructions causing, when executed, the processor 120 to receive a call request via the phone number, to transmit a first call log associated with a missed call to a server 230 in response to a stopped reception of the call request, to receive a first response signal regarding transmission of the first call log from the server 230, to store the first call log in the memory 130, based on the first response signal, to receive a push signal from the server 230, wherein the push signal is generated by the server 230, based on a second call log received from the external device and generated by the external device based on the call request, and to update the first call log stored in the memory 130, based on the push signal.

The second call log may contain one of call processing results including a call answer, a user's call rejection, an automatic call rejection, a call answer of other electronic device, and a call rejection of other electronic device.

The memory 130 may further store instructions causing, when executed, the processor 120 to display, through the display 160, a user interface including a call log interface corresponding to the first call log stored in the memory 130, and to change a symbol associated with a call processing result contained in the call log interface to a symbol corresponding to the second call log, based on a change from the first call log stored in the memory 130 to the second call log.

The memory 130 may further store instructions causing, when executed, the processor 120 to provide a call function as a response to the call request, based on a user input, to transmit a third call log associated with a call answer to the server 230 when the call function is terminated, to receive a second response signal regarding transmission of the third call log from the server 230, and to change the first call log stored in the memory 130 to the third call log, based on the second response signal.

The memory 130 may further store instructions causing, when executed, the processor 120 to display, through the display 160, a user interface including a call log interface corresponding to the first call log stored in the memory 130, and to change a symbol associated with a call processing result contained in the call log interface to a symbol corresponding to the third call log, based on a change from the first call log stored in the memory 130 to the third call log.

Figure 4:
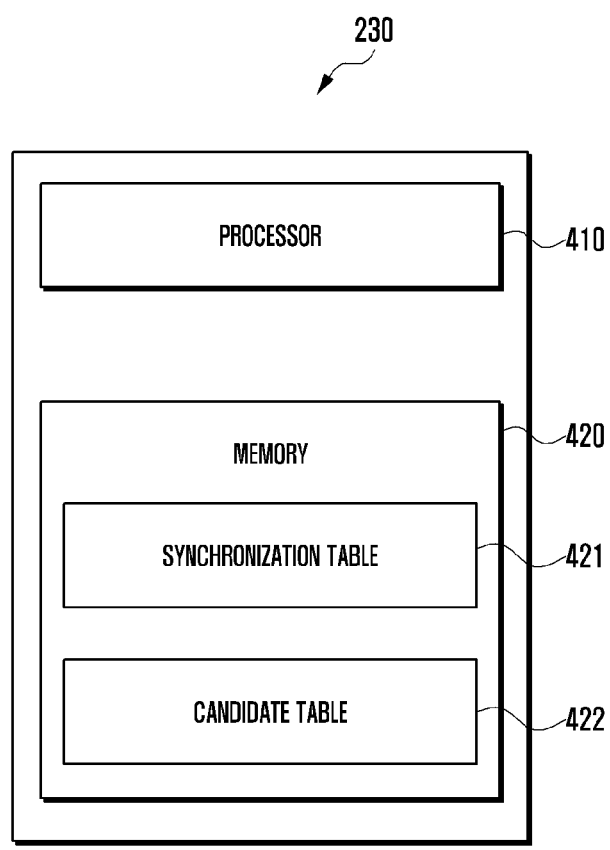
FIG. 4 is a block diagram illustrating a server according to an embodiment of the disclosure.

According to various embodiments of the disclosure, a server (e.g., the server 230 in FIG. 4) may include a memory (e.g., the memory 420 in FIG. 4) including a table storing a plurality of call logs, and a processor (e.g., the processor 410 in FIG. 4). The processor 410 may be configured to receive a call log associated with the phone number from one of the plurality of electronic devices (e.g., 220 in FIG. 2), to determine whether the received call log has a correlation with the plurality of call logs stored in the table, to when the received call log has the correlation, merge the received call log with the stored call logs of the table, based on a predefined condition, so as to update the stored call logs of the table, based on a merge result, to when the received call log has no correlation, newly store the received call log in the table so as to update the stored call logs of the table, and to transmit an update result of the table to the plurality of electronic devices 220.

Each of the plurality of call logs may contain device identification information, call partner information, time information, or a call processing result, and when a call log having the same call partner information as the call partner information of the received call log and also having time information within a particular time range from the time information of the received call log exists in the table, the processor 410 may be configured to determine that the received call log has the correlation.

The call processing result may include a missed call, a call answer, a user's call rejection, an automatic call rejection, a call answer of other electronic device, and a call rejection of other electronic device.

The table may include a synchronization table (e.g., 421 in FIG. 4) and a candidate table (e.g., 422 in FIG. 4). When determining whether the received call log has a correlation with the plurality of call logs stored in the table, the processor 410 may be further configured to newly add the received call log to the candidate table 422, to retrieve, from the candidate table 422, a call log having the same call partner information as the call partner information of the received call log and also having time information within a particular time range from the time information of the received call log, as a first predefined search condition, to determine that the received call log has the correlation, when two or more call logs are retrieved from the candidate table 422, and to determine that the received call log has no correlation, when only one call log is retrieved from the candidate table 422.

The processor 410 may be further configured to compare the call processing results of the retrieved call logs, based on predefined priorities, when two or more call logs are retrieved from the candidate table 422, based on the first predefined search condition, to determine a specific call log having a call processing result of a higher priority among the retrieved call logs, based on a comparison result, to update the synchronization table 421, based on the determined specific call log, and to transmit update information of the synchronization table 421 to the plurality of electronic devices 220.

The call answer or the user's call rejection may be the call processing result having the highest priority.

The processor 410 may be further configured to newly add the received call log to the synchronization table 421 to update the plurality of call logs stored in the synchronization table 421, based on predefined priorities, when only one call log is retrieved from the candidate table 422, based on the first predefined search condition, and to transmit update information of the synchronization table 421 to the plurality of electronic devices 220.

The processor 410 may be further configured to retrieve, from the candidate table 422, a call log having the same device identification information as the device identification information of the received call log and also having the same time information as the time information of the received call log, as a second predefined search condition, to newly add the received call log to the synchronization table 421 to update the plurality of call logs stored in the synchronization table 421, when a call log satisfying the second predefined search condition is retrieved from the candidate table 422, and to transmit update information of the synchronization table 421 to the plurality of electronic devices 220.

The processor 410 may be further configured to determine whether the received call log has a correlation with the plurality of call logs stored in the table, when a call log satisfying the second predefined search condition is not retrieved from the candidate table 422.

The processor 410 may be further configured to transmit update information of the synchronization table 421 to the plurality of electronic devices 220 through a push server 230.

Figure 2:
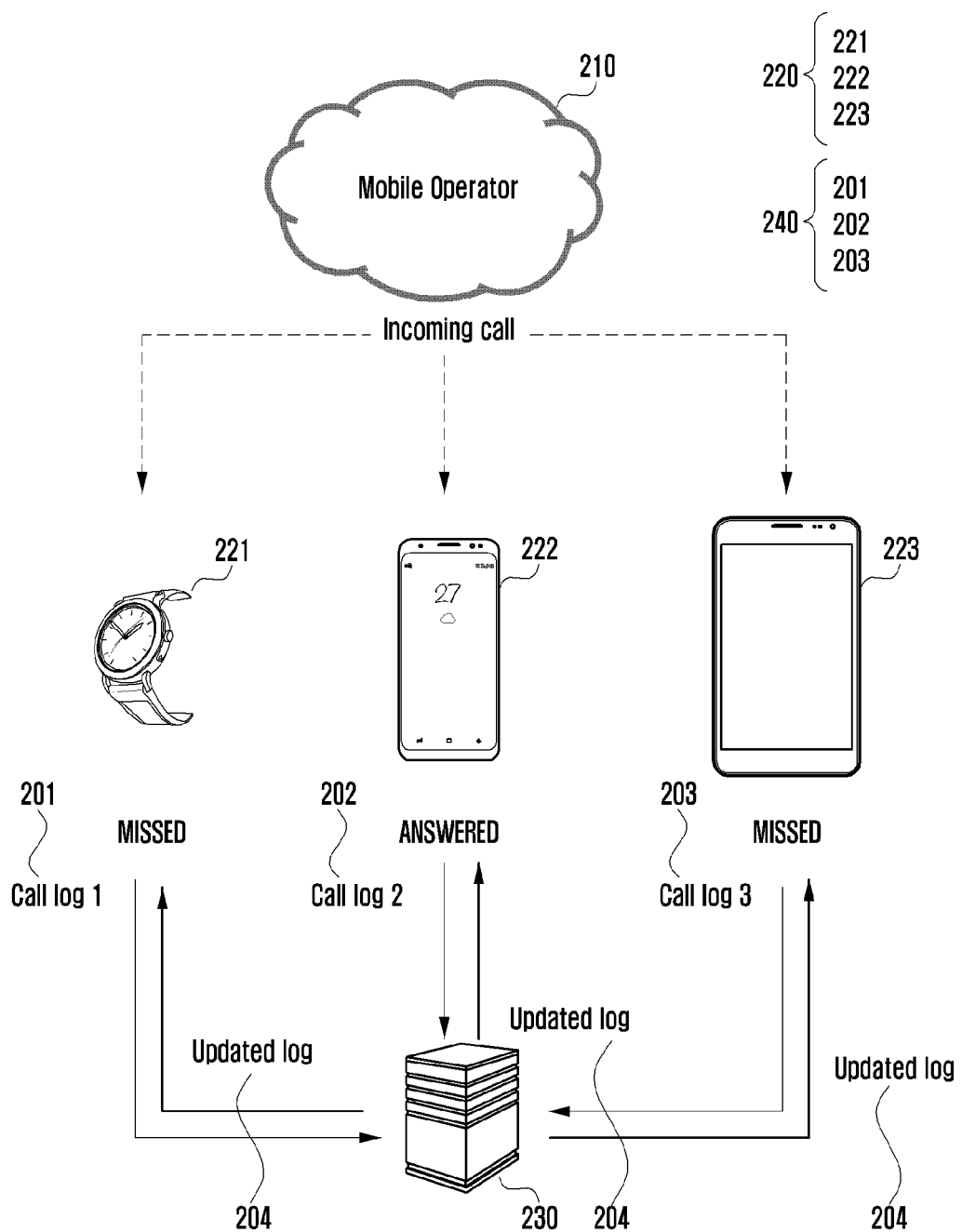
FIG. 2 is a schematic diagram illustrating a system according to an embodiment of the disclosure.

FIG. 2 is a schematic diagram illustrating a system according to an embodiment of the disclosure.

Referring to FIG. 2, the system according to an embodiment may include a mobile communication operator 210 (hereinafter, a mobile operator), a plurality of electronic devices 220 configured to share a single phone number, and a server 230.

According to an embodiment, the mobile operator 210 may provide the plurality of electronic devices 220 with a service for receiving or sending a call using one phone number. For example, when a call request event is received via a specific phone number, the mobile operator 210 may transmit a call request to the electronic devices 220 that share the specific phone number. In addition, when an outgoing call request is received from any one of the electronic devices 220 that share the specific phone number, the mobile operator 210 may provide a service of call connection with other device in response to the outgoing call request.

According to an embodiment, when a call request event is received via a specific phone number, the mobile operator 210 may transmit a call request to the electronic devices 220 sharing the specific phone number. Then, when one (e.g., a first electronic device 221) of the electronic devices 220 answers the call request, the mobile operator 210 may stop transmitting the call request to the other electronic devices (e.g., a second electronic device 222 and a third electronic device 223). In addition, when one (e.g., the first electronic device 221) of the electronic devices 220 rejects the call request, the mobile operator 210 may stop transmitting the call request to the other electronic devices (e.g., the second electronic device 222 and the third electronic device 223). According to another embodiment, even if one (e.g., the first electronic device 221) of the electronic devices 220 answers the call request, the mobile operator 210 may transmit the call request to the other electronic devices (e.g., the second electronic device 222 and the third electronic device 223) for a predetermined time.

According to a certain embodiment, when one (e.g., the second electronic device 222) of the electronic devices 220 answers the call request, the mobile operator 210 may stop transmitting the call request to the other electronic devices (e.g., the first electronic device 221 and the third electronic device 223) and instead transmit code information indicating a call answer of the one electronic device (e.g., the second electronic device 222) to the other electronic devices (e.g., the first electronic device 221 and the third electronic device 223). In addition, when one (e.g., the second electronic device 222) of the electronic devices 220 rejects the call request, the mobile operator 210 may stop transmitting the call request to the other electronic devices (e.g., the first electronic device 221 and the third electronic device 223) and instead transmit code information indicating a call rejection of the one electronic device (e.g., the second electronic device 222) to the other electronic devices (e.g., the first electronic device 221 and the third electronic device 223). According to a certain embodiment, the electronic device 220 may determine a call processing result of a call log, based on such code information received from the mobile operator 210. For example, based on such code information received from the mobile operator 210, the electronic device 220 may determine, as the call processing result of the call log, "a call answer of other device (i.e., answered_externally)" or "a call rejection of other device (i.e., rejected_externally)".

According to an embodiment, the plurality of electronic devices 220 may be configured to share the same one phone number. According to an embodiment, each of the plurality of electronic devices 220 may include the same or similar components as or to those of the electronic device 101 shown in FIG. 1. According to the illustrated example, the plurality of electronic devices 220 may include the first electronic device 221, the second electronic device 222, and the third electronic device 223. For example, the first electronic device 221 may be a smart watch, the second electronic device 222 may be a smart phone, and the third electronic device 223 may be a tablet PC. According to the illustrated example, the first, second, and third electronic devices 221, 222, and 223 may share the same one phone number. For example, when a call request event occurs via the shared phone number, the mobile operator 210 may transmit a call request associated with the call request event to the first, second, and third electronic devices 221, 222, and 223, According to an embodiment, each of the electronic devices 220 may generate a call log, based on the received call request, and then transmit the generated call log to the server 230. According to an embodiment, each of the electronic devices 220 may include a memory (e.g., 130 in FIG. 1) for storing the call log and, based on a push signal or a response signal provided by the server 230, update or change the call log stored in the memory 130. According to an embodiment, the push signal may be a signal that the server 230 requests the plurality of electronic devices 220 to update the call log stored in the memory 130. For example, the push signal may contain a changed call log. According to an embodiment, the response signal may be an acknowledgment (ACK) signal that the server 230 notifies the reception of the call log to a certain electronic device that transmitted the call log.

According to an embodiment, the respective electronic devices 220 may generate call logs 240 independently. For example, the first electronic device 221 may generate a first call log 201 in response to a call request, the second electronic device 222 may generate a second call log 202 in response to the call request, and the third electronic device 223 may generate a third call log 203 in response to the call request. According to an embodiment, each of the call logs 201, 202, and 203 may contain call partner information (e.g., caller information), device identification information of the electronic devices 220, time information, and/or a call processing result.

According to an embodiment, the call processing result may include at least one of a missed call, a call answer, a user's call rejection, an automatic call rejection, a call answer of other electronic device, or a call rejection of other electronic device. According to an embodiment, the "missed call" may indicate a state where the reception of a call request is stopped before the electronic device 221, 222, or 223 receives an answer to the call request from the user. According to an embodiment, the "call answer" may indicate a state where the electronic device 221, 222, or 223 answers a call request, based on a user input. According to an embodiment, the "user's call rejection" may indicate a state where the electronic device 221, 222, or 223 rejects a call request, based on another user input. According to an embodiment, the "automatic call rejection" may indicate a state where the electronic device 221, 222, or 223 automatically rejects a call request, based on a predefined condition. According to an embodiment, the "call answer of other electronic device" may indicate a state where one electronic device (e.g., the first electronic device 221) receiving a call request does not answer the call request and instead any other electronic device (e.g., the second electronic device 222 or the third electronic device 223) sharing the same phone number provides a call function in response to the call request. According to an embodiment, the "call rejection of other electronic device" may indicate a state where such other electronic device sharing the same phone number rejects a call request.

In the illustrated embodiment, the user answers a call request through the second electronic device 222, so that the second electronic device 222 is in an answered state. On the other hand, each of the first and third electronic devices 221 and 223 is in a missed call state because the call request is stopped. In this case, the first electronic device 221 may generate the first call log 201 indicating that a call processing result is a "missed call", the second electronic device 220 may generate the second call log 202 indicating that a call processing result is a "call answer", and the third electronic device 220 may generate the third call log 203 indicating that a call processing result is a "missed call".

In the illustrated embodiment, the first call log 201, the second call log 202, and the third call log 203, which are generated respectively by the first to third electronic devices 221, 222, and 223, may be as shown in Table 1. Although the first to third call logs 201, 202, and 203 are shown in the form of table for convenience of explanation, they may be configured in any other suitable form such as a file or a database. Alternatively, the first to third call logs 201, 202, and 203 may be configured in different forms.

TABLE 1

| | Call Partner | Device ID | Time Info | Call Processing Result |
|---|---|---|---|---|
| 1st call log 201 | G. Hong | SM-R770N | 7:00:01 PM | missed call |
| 2nd call log 202 | G. Hong | SM-G960N | 7:00:05 PM | call answer |
| 3rd call log 203 | G. Hong | SM-T825N | 7:00:15 PM | missed call |

Referring to Table 1, all the call logs 201, 202, and 203 have the same subject of a call request event, so that a call partner item may have the same data.

According to an embodiment, a device ID item of the first to third call logs 201, 202, and 203 may have identification information of each of the first to third electronic devices 221, 222, and 223.

According to an embodiment, a time information item of the first to third call logs 201, 202, and 203 may have different times because the first to third electronic devices 221, 222, and 223 have in general different communication environments.

According to an embodiment, the time information item of the first to third call logs 201, 202, and 203 generated by the first to third electronic devices 221, 222, and 223 based on the same call request event may have different time data up to 30 seconds, for example. That is, time data of the time information item may have a difference within a particular time range (e.g., 30 seconds) depending on a difference in communication environments.

According to an embodiment, a call processing result item of the first to third call logs 201, 202, and 203 may have data determined based on whether the user answers a call request. For example, the call processing result item of the second call log 202 may have a "call answer" as the call processing result, and the call processing result item of the first and third call logs 201 and 203 may have a "missed call" as the call processing result.

According to an embodiment, the first to third call logs 201, 202, and 203 generated by the first to third electronic devices 221, 222, and 223 may be transmitted to the server 230. For example, the server 230 may receive the call logs 201, 202, and 203 as shown in Table 1 from the first to third electronic devices 221, 222, and 223.

According to an embodiment, the server 230 may be configured to receive the call logs 201, 202, and 203 from the plurality of electronic devices 220 and manage the received call logs 201, 202, and 203 in order to synchronize the call logs stored in the plurality of electronic devices 220. According to an embodiment, the server 230 may include a memory (e.g., 420 in FIG. 4) that stores the call logs 201, 202, and 203 received from the plurality of electronic devices 220.

According to an embodiment, the server 230 may have the same or similar configuration as or to that of the electronic device 101 shown in FIG. 1.

According to an embodiment, the server 230 may determine whether newly received call logs 201, 202, and 203 correlate with call logs stored in the memory. Then, based on such a correlation, the server 230 may update the call logs stored in the memory. For example, updating the call logs stored in the memory may include changing the call log stored in the memory, merging the call logs stored in the memory, or newly adding the received call logs 201, 202, and 203 into the memory. According to an embodiment, when information of the call logs stored in the memory is updated, the server 230 may transmit information of updated call logs 204 to the plurality of electronic devices 220.

According to an embodiment, the plurality of electronic devices 220 may receive the updated call logs 204 from the server 230 in the form of a push signal. According to an embodiment, based on the push signal, each of the electronic devices 220 may update the call log stored in the memory 130. As a result, the call logs of the plurality of electronic devices 220 may be synchronized.

According to another embodiment, the plurality of electronic devices 220 may send a request for updated call logs 204 to the server 230 at regular intervals, and then the server 230 may transmit the updated call logs 204 to the plurality of electronic devices 220 in response to the request of the electronic devices 220. According to a certain embodiment, even if there is no request for updated call logs 204 from the plurality of electronic devices 220, the server 230 may transmit the updated call logs 204 to the plurality of electronic devices 220 at regular intervals.

Figure 3A:
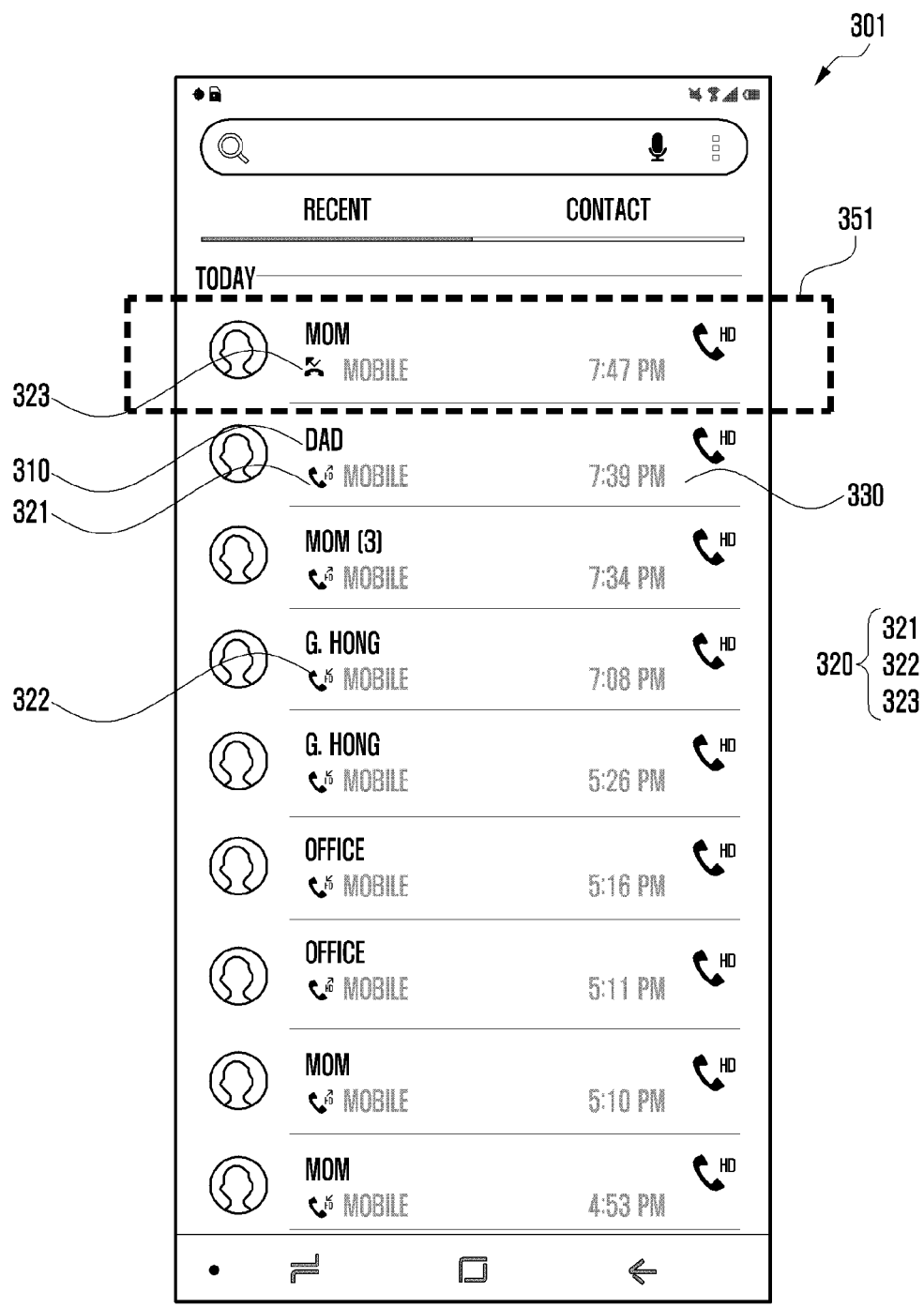
FIGS. 3A to 3C are screenshots showing an example of an electronic device user interface for displaying call logs.
Figure 3B:
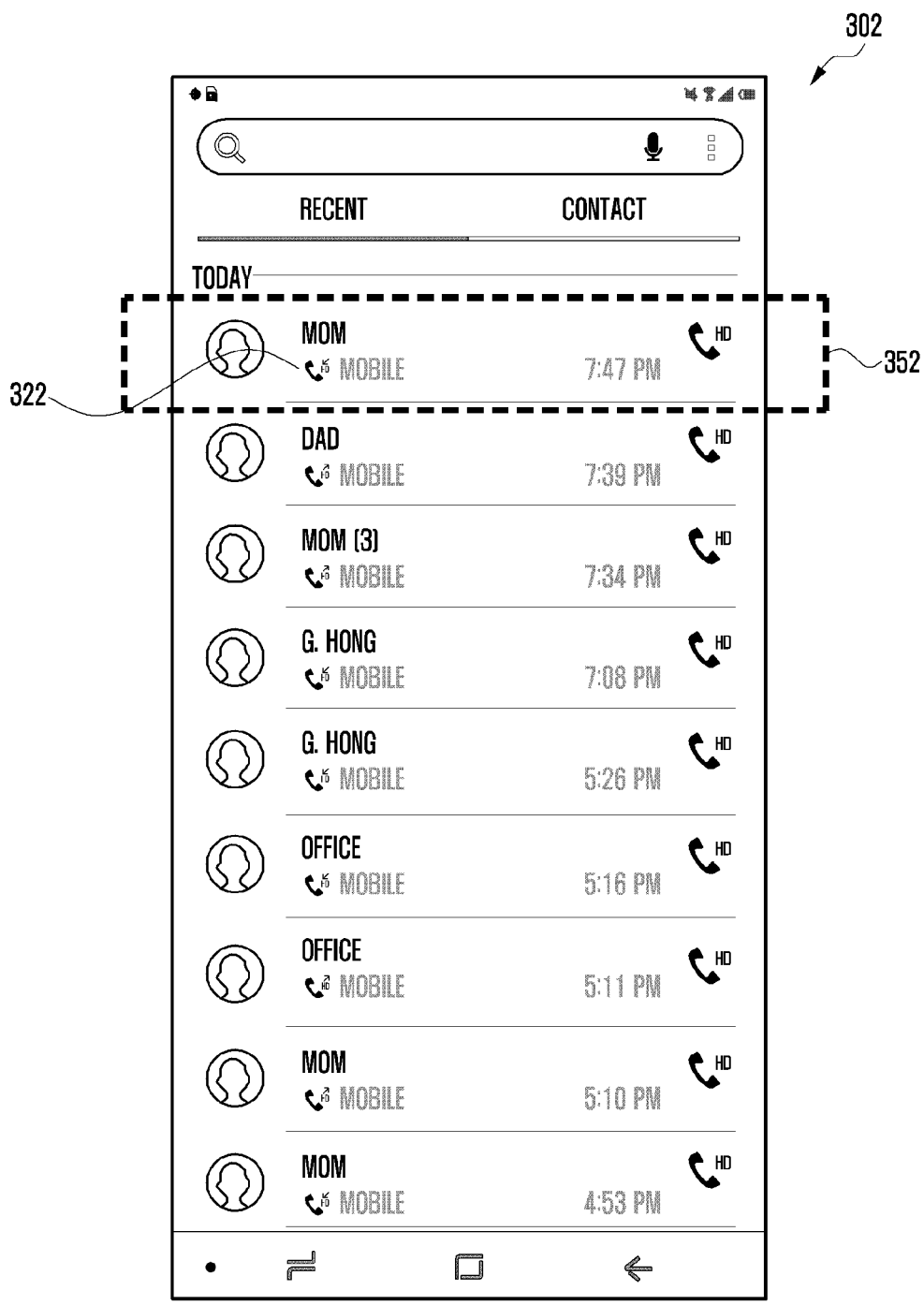
Figure 3C:
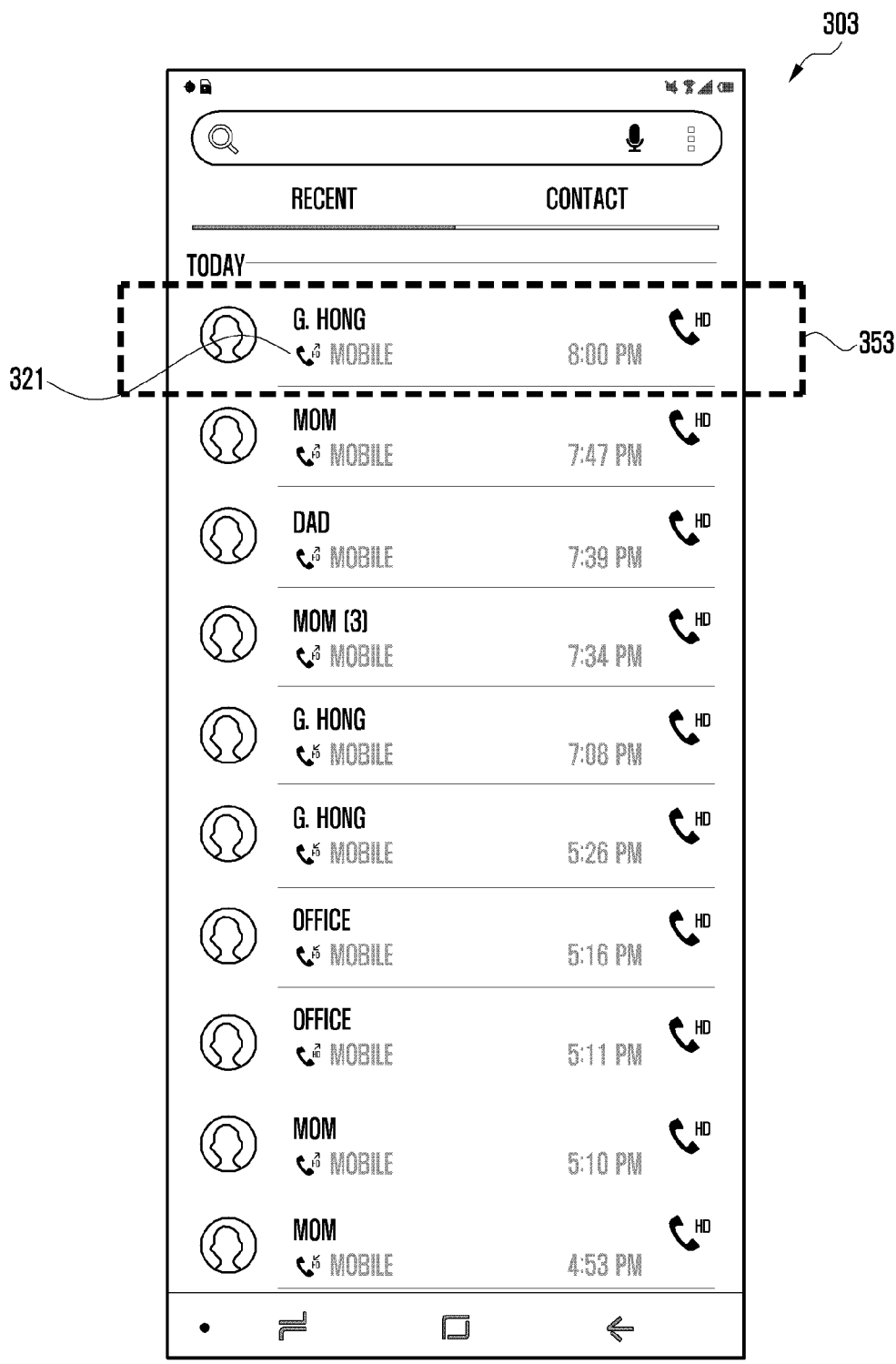

FIGS. 3A to 3C are screenshots showing an example of an electronic device user interface for displaying call logs.

Referring to FIG. 3A, an electronic device (e.g., the first electronic device 221 in FIG. 2) according to an embodiment may provide a user interface 301 that displays a call log stored in a memory (e.g., 130 in FIG. 1). According to an embodiment, the user interface 301 shows a list of call log interfaces 351 based on a plurality of call logs (e.g., the first call log 201 in FIG. 2), and each of the call log interfaces 351 may contain a symbol 310 indicating a call partner, a symbol 320 indicating a call processing result, and/or a symbol 330 indicating time information.

According to an embodiment, the symbol 320 indicative of the call processing result may include a first symbol 321 representing an outgoing call, a second symbol 322 representing an incoming call answer, and/or a third symbol 323 representing a missed call. In the illustrated example, the most recently generated one of the call log interfaces 351 indicates "mom" as the call partner, "7:47 PM" as the time information, and "missed call" as the call processing result. The electronic device 221 may transmit a call log containing such information to a server (e.g., 230 in FIG. 2).

According to an embodiment, the server 230 may determine whether the call log received from the electronic device 221 has a correlation with call logs stored in a memory (e.g., 420 in FIG. 4) of the server 230. Then, based on the correlation, the server 230 may update the call log. For example, when a call request event from mother occurs at 7:47 pm, and when any other electronic device (e.g., the second electronic device 222) sharing a phone number with the electronic device 221 answers an incoming call, the server 230 may update the call processing result of the call log associated with the call request event to be an incoming call answer. In this case, the server 230 may transmit the updated call log to the plurality of electronic devices 220 that share the phone number.

Referring to FIG. 3B, the electronic device (e.g., the first electronic device 221 in FIG. 2) according to an embodiment may receive, from the server 230, a push signal that contains the updated call log (e.g., 204 in FIG. 2). Then, based on the received push signal, the electronic device 221 may update the stored call log and display a new call log interface 352 corresponding to the updated call log. For example, based on the push signal received from the server 230, the electronic device 221 may store the call processing result for the incoming call received from the mother at 7:47 pm as an "incoming call answer" rather than a "missed call". In the illustrated example, a user interface 302 shows the call log interface 352 in which the symbol 320 indicative of the call processing result is changed from the third symbol 323 representing a missed call to the second symbol 322 representing an incoming call answer.

According to an embodiment, an outgoing call event may occur at any other electronic device (e.g., the second electronic device 222 in FIG. 2) that shares a phone number with the electronic device (e.g., the first electronic device 221 in FIG. 2), and the corresponding call log may be transmitted to the electronic device 221 through the server 230. For example, if any other electronic device 222 makes a call to a certain call partner (e.g., G. Hong) at 8:00 pm, this electronic device 222 may send a call log containing such information to the server 230. In this case, the server 230 may store the call log received from the electronic device 222 in the memory 420 and then transmit the call log to the plurality of electronic devices 220 that share a phone number.

Referring to FIG. 3C, the electronic device (e.g., the first electronic device 221 in FIG. 2) according to an embodiment may receive, from the server 230, a call log generated based on an outgoing call of any other electronic device (e.g., the second electronic device 222 in FIG. 2) and then, based on the received call log, update a call log stored in the memory 130. For example, the electronic device 221 may store a new call log in the memory 130, based on a push signal received from the server 230. In the illustrated example, the electronic device 221 newly adds a call log of an outgoing call made to G. Hong at 8:00 pm, based on a push signal received from the server 230. Then, a user interface 303 contains a new call log interface 353 corresponding to the newly added call log. In the illustrated example, the newly added call log interface 353 may have the first symbol 321 indicating an outgoing call.

FIG. 4 is a block diagram illustrating a server according to an embodiment of the disclosure.

Referring to FIG. 4, a server 230 according to an embodiment may include a processor 410 and a memory 420.

According to an embodiment, the processor 410 may control the overall operation of the server 230.

According to an embodiment, the processor 410 may have the same or similar configuration as or to that of the processor 120 shown in FIG. 1.

According to an embodiment, the processor 410 may receive call logs (e.g., 240 in FIG. 2) from a plurality of electronic devices (e.g., 220 in FIG. 2) sharing a phone number, store the received call logs in the memory 420, and manage the call logs stored in the memory 420.

According to an embodiment, the processor 410 may determine a correlation between the call logs 240 received from the plurality of electronic devices 220 and other call logs previously stored in the memory 420. Then, based on a predefined condition, the processor 410 may merge call logs that correlate with each other.

According to an embodiment, the memory 420 may store the call logs 240 received from the plurality of electronic devices 220. According to an embodiment, the memory 420 may store a synchronization table 421 and a candidate table 422.

According to an embodiment, the synchronization table 421 may be used to synchronize the call logs of the plurality of electronic devices 220. For example, the processor 410 may manage the call logs stored in the synchronization table 421 and, when any call log stored in the synchronization table 421 is updated, transmit updated information to the plurality of electronic devices 220. According to an embodiment, the processor 410 may transmit information of the updated call log to the plurality of electronic devices 220 via a push server (e.g. 1054 in FIG. 10).

According to an embodiment, when the call log 240 is received from any one of the electronic devices 220, the candidate table 422 may be used to determine whether the received call log 240 correlates with a call log previously stored in the memory 420. For example, a correlation between call logs may mean that such call logs are generated based on the same call event. In another example, a correlation between call logs may mean that such call logs have the same call partner and also have time information belonging to a certain range.

According to a certain embodiment, the function or operation of the server 230 may be performed by any one of the plurality of electronic devices 220. In this case, the plurality of electronic devices 220 sharing a phone number may be classified into one main electronic device (e.g., the second electronic device 222 in FIG. 2) and one or more sub electronic devices (e.g., the first and third electronic devices 221 and 223 in FIG. 2). According to an embodiment, the main electronic device 222 and the sub electronic devices 221 and 223 may be connected via a short range communication and thereby exchange the call log 240 and the push signal. According to an embodiment, the short range communication may be, for example, a Bluetooth communication.

According to various embodiments of the disclosure, an operating method of an electronic device configured to share a single phone number with an external device may include operation of receiving a call request via the phone number, operation of transmitting a first call log associated with a missed call to a server 230 in response to a stopped reception of the call request, operation of receiving a first response signal regarding transmission of the first call log from the server 230, operation of storing the first call log in a memory 130 of the electronic device, based on the first response signal, operation of receiving a push signal from the server 230, wherein the push signal is generated by the server 230, based on a second call log received from the external device and generated by the external device based on the call request, and operation of changing the first call log stored in the memory 130 to the second call log, based on the push signal.

The second call log may contain one of call processing results including a call answer, a user's call rejection, an automatic call rejection, a call answer of other electronic device, and a call rejection of other electronic device.

The method may further include operation of providing a call function as a response to the call request, based on a user input, operation of transmitting a third call log associated with a call answer to the server 230 when the call function is terminated, operation of receiving a second response signal regarding transmission of the third call log from the server 230, and operation of changing the first call log stored in the memory 130 to the third call log, based on the second response signal.

The method may further include operation of displaying, through a display 160 of the electronic device, a user interface including a call log interface corresponding to the first call log stored in the memory 130, and operation of changing a symbol associated with a call processing result contained in the call log interface to a symbol corresponding to the second call log, based on a change from the first call log stored in the memory 130 to the second call log.

The method may further include operation of displaying, through the display 160, a user interface including a call log interface corresponding to the first call log stored in the memory 130, and operation of changing a symbol associated with a call processing result contained in the call log interface to a symbol corresponding to the third call log, based on a change from the first call log stored in the memory 130 to the third call log.

Figure 5:
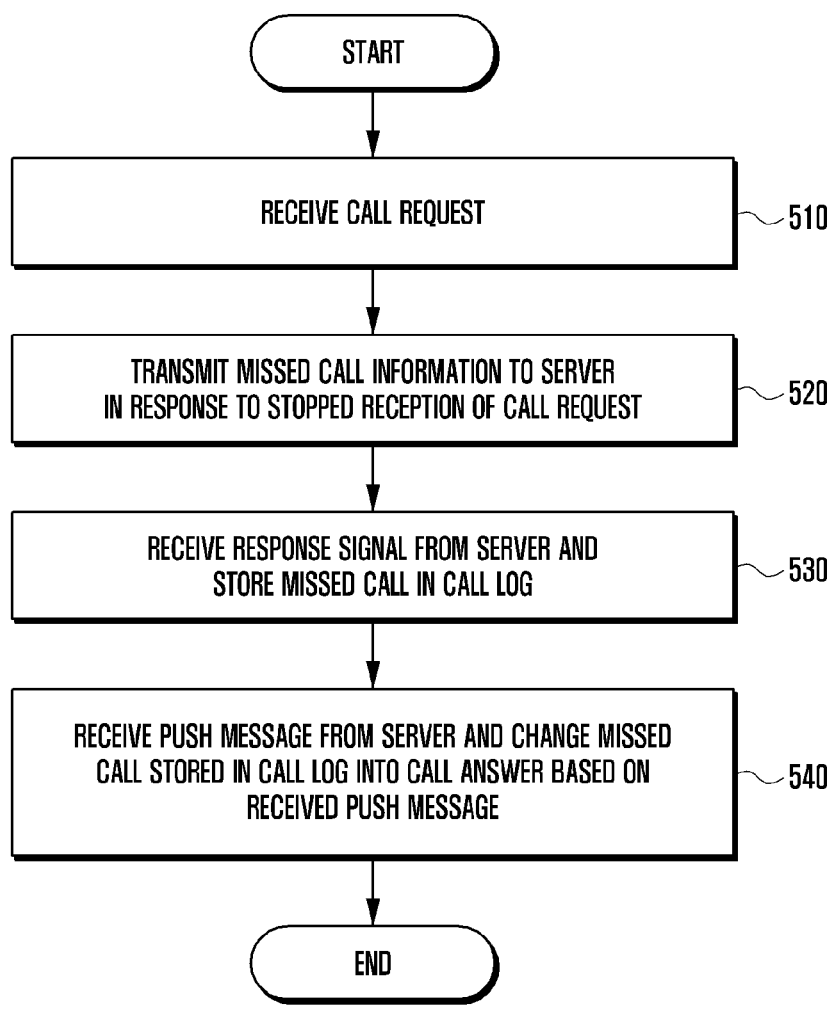
FIG. 5 is a flow diagram illustrating operations of an electronic device according to an embodiment of the disclosure.

FIG. 5 is a flow diagram illustrating operations of an electronic device according to an embodiment of the disclosure.

At operation 510, an electronic device (e.g., the first electronic device 221 in FIG. 2) according to an embodiment may receive a call request from a mobile operator (e.g., 210 in FIG. 2). For example, the electronic device 221 may receive the call request via one phone number shared with the other electronic devices (e.g., the second and third electronic devices 222 and 223 in FIG. 2). According to an embodiment, when the call request is received, the electronic device 221 may output a notification associated with the call request. For example, the electronic device 221 may output at least one of a ring tone or a vibration as the notification. In another example, the electronic device 221 may control a display (e.g., the display device 160 in FIG. 1) to output a user interface that represents the reception of the call request.

At operation 520, when the reception of the call request is stopped, the electronic device 221 may transmit a call log containing a missed call as a call processing result to the server 230. For example, when the reception of the call request is stopped, the electronic device 221 may determine the call processing result to be a missed call and then transmit a first call log (e.g., 201 in FIG. 2) containing the missed call to the server 230. According to an embodiment, the call log such as the first call log transmitted by the electronic device 221 may include a plurality of items such as device identification information of the electronic device 221, time information, a call partner, and/or a call processing result. According to an embodiment, the call processing result may include at least one of a missed call, a call answer, a user's call rejection, an automatic call rejection, a call answer of other electronic device, or a call rejection of other electronic device.

At operation 530, the electronic device 221 may receive a response signal from the server 230 and then, based on the received response signal, store the first call log containing the missed call as the call processing result in the memory 130. For example, the electronic device 221 may receive, from the server 230, a first response signal as a response to the first call log 201 being sent to the server 230. According to an embodiment, the first response signal may be an acknowledgment (ACK) signal that the server 230 notifies the reception of the first call log 201 to the electronic device 221. Then, based on the first response signal, the electronic device 221 may store the first call log 201 in the memory. According to an embodiment, the electronic device 221 may display a user interface (e.g., 301 in FIG. 3A) showing call logs on a display (e.g., 160 in FIG. 1) and, based on the first response signal, display the first call log 201 in the user interface 301.

At operation 540, the electronic device 221 may receive a push signal (or push message) from the server 230 and, based on the received push signal, change a "missed call" stored as the call processing result of the first call log 201 into a "call answer". According to an embodiment, after such a change, the electronic device 221 may display a new user interface (e.g., 302 in FIG. 3B) containing a call log interface (e.g., 352 in FIG. 3B) in which a third symbol (e.g., 323 in FIG. 3A) representing the missed call is changed to a second symbol (e.g., 322 in FIG. 3B) representing the incoming call answer.

According to an embodiment, the push signal may be a message that requests a change in the call processing result item of the call log. For example, the push signal may be a message requesting a change in a call log associated with the call request received at operation 510 or in all call logs, or a message requesting to change the call processing result item of at least some call logs to a call answer. For example, the electronic device 221 may update the call processing result item of the first call log 201, based on the received push signal. In another example, the electronic device 221 may change the first call log 201 stored in the memory 130 to a second call log (e.g., 202 in FIG. 2), based on the push signal. According to an embodiment, the push signal may contain the second call log 202 generated by any other electronic device (e.g., the second electronic device 222 in FIG. 2) in response to the call request. For example, the second call log 202 may be generated by any other electronic device 222 in response to the call request and then delivered to the electronic device 221 via the server 230. According to an embodiment, the second call log 202 may contain one of call processing results including a call answer, a user's call rejection, an automatic call rejection, a call answer of other electronic device, or a call rejection of other electronic device.

According to another embodiment, in addition to updating the call log by receiving the push signal from the server 230, the electronic device 221 may update the call log by using various methods. For example, without receiving the push signal from the server 230, the electronic device 221 may send a request for the updated call logs 204 to the server 230 at regular intervals. Then, the server 230 may transmit the updated call logs 204 to the plurality of electronic devices 220 sending such a request at regular intervals. In another example, even if receiving no request for the updated call logs 204 from the electronic devices 220, the server 230 may transmit the updated call logs 204 to the plurality of electronic devices 220 at regular intervals.

Figure 6:
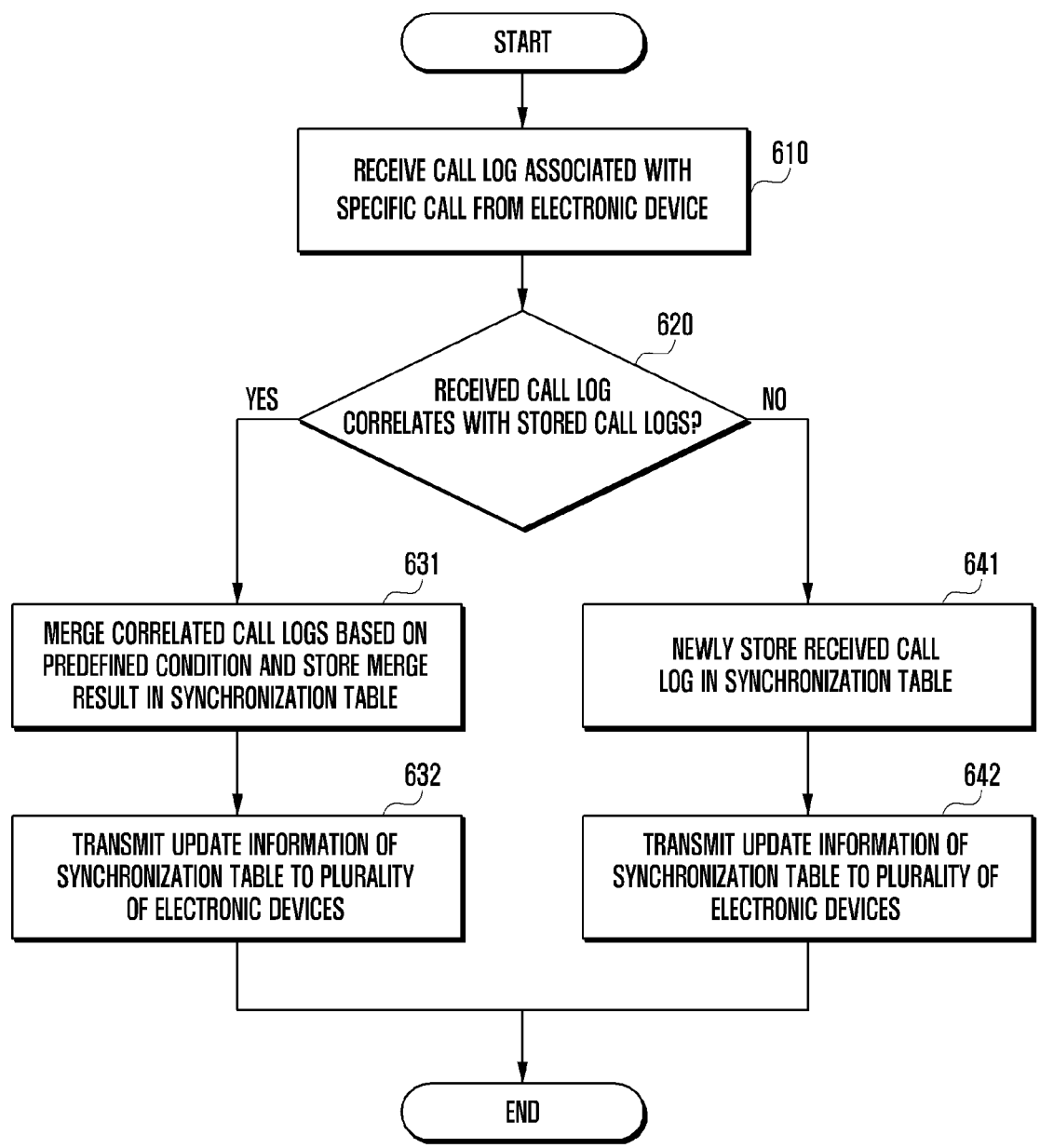
FIG. 6 is a flow diagram illustrating operations of a server according to an embodiment of the disclosure.

FIG. 6 is a flow diagram illustrating operations of a server according to an embodiment of the disclosure.

At operation 610, a server (e.g., 230 in FIG. 2) may receive a call log 240 associated with a specific call from any one (e.g. 221 in FIG. 2) of a plurality of electronic devices (e.g., 220 in FIG. 2) sharing the same single phone number. For example, the server 230 may receive the call log 240 from an electronic device receiving a call request or an electronic device making an outgoing call. According to an embodiment, the call log 240 transmitted to the server 230 by the electronic device 220 receiving the call request may contain one of call processing results including a missed call, a call answer, a user's call rejection, an automatic call rejection, a call answer of other electronic device, or a call rejection of other electronic device. According to an embodiment, the call log 240 transmitted to the server 230 by the electronic device 220 making the outgoing call may contain a call processing result indicating an outgoing call.

At operation 620, the server 230 may determine whether there is a correlation between the call log 240 received from the electronic device 220 and a plurality of call logs stored in a table (e.g., the candidate table 422 in FIG. 4) of the memory 420. For example, by retrieving the call logs in a synchronization table (e.g., 421 in FIG. 4), based on a predefined search condition, the server 230 may determine whether the received call log 240 correlates with the call logs stored in the synchronization table.

According to an embodiment, the predefined search condition may indicate a call log having time information within a particular time range from time information of the received call log 240 and also having the same call partner as that of the received call log 240.

That is, by retrieving, from the candidate table 422, a call log having time information within a particular time range from time information of the received call log 240 and also having the same call partner as that of the received call log 240, the server 230 may select call logs that are likely to correlate with the same call event as that of the received call log 240.

According to an embodiment, the particular time range may be set differently in consideration of variations in communication environments of the electronic devices 220. For example, the particular time range may be set from 10 seconds to 30 seconds.

At operation 631, when it is determined that the received call log 240 correlates with the plurality of call logs stored in the candidate table 422 of the memory 420, the server 230 may merge the received call log 240 and the call logs retrieved from the candidate table 422, based on a predefined condition, and then update call logs stored in the synchronization table 421, based on a merge result. For example, the server 230 may compare the call processing result of the received call log 240 with the call processing results of the call logs retrieved from the candidate table 422, and thereby determine a specific call log having the call processing result of higher priority. Then, based on the determined call log, the server 230 may merge the received call log 240 and the call logs retrieved from the candidate table 422.

For example, Table 2 shows the first call log 201 that the server 230 receives from a certain electronic device (e.g., the first electronic device 221 in FIG. 2), and call logs that the server 230 retrieves from the candidate table 422 on the basis of the search condition.

TABLE 2

| | Call Partner | Device ID | Time Info | Call Processing Result |
|---|---|---|---|---|
| 1st call log 201 | Mother | SM-R770N | 7:47:00 PM | missed call |
| 2nd call log 202 (stored in the server before reception of 1st call log) | Mother | SM-G960N | 7:46:55 PM | call answer |
| 3rd call log 203 (stored in the server before reception of 1st call log) | Mother | SM-T825N | 7:47:10 PM | missed call |

In the example shown in Table 2, the server 230 may compare the call processing results of the first, second, and third call logs 201, 202, and 203, and thereby determine a call log having the call processing result of higher priority. That is, the server 230 may compare the priority of "missed call" in the first and third call logs 201 and 203 with the priority of "call answer" in the second call log 202.

According to an embodiment, among call processing results, "call answer" or "user's call rejection" may have the highest priority. Thus, in the example of Table 2, the server 230 may determine that the "call answer" of the second call log has a higher priority, and then merge the first to third call logs, based on the second call log. According to an embodiment, the priorities of the call processing results may be as shown in Table 3. In Table 3, priority 1 indicates the highest priority, and priority 3 indicates the lowest priority.

TABLE 3

| Priority | Call processing result |
|---|---|
| 1 | Call answer (answered) |
| 2 | User's call rejection (rejected) |
| 3 | Missed call (missed), Call answer of other electronic device (answered_externally), Call rejection of other electronic device (rejected_externally), Automatic call rejection (autorejected) |

According to an embodiment, based on the second call log 202 having the call processing result of the highest priority, the server 230 may merge the received first call log 201 and the second and third call logs 202 and 203 retrieved from the candidate table 422. That is, the server 230 may merge the received first call log 201 and the second and third call logs 202 and 203 retrieved from the candidate table 422 into the second call log 202.

According to an embodiment, the server 230 may update the synchronization table 421, based on a merge result. For example, the server 230 may retrieve the second and third call logs 202 and 203 from the synchronization table 421 and then merge the retrieved second and third call logs 202 and 203 into the second call log 202. In another example, if the call log having the call processing result of the highest priority is the first call log 201, the server 230 may merge the second and third call logs 202 and 203 retrieved from the synchronization table 421 into the first call log 201.

At operation 632, the server 230 may transmit update information of the synchronization table 421 to the plurality of electronic devices 220. For example, the server 230 may transmit, to the electronic device 220, information indicating that the first to third call logs 201, 202, and 203 are merged into the second call log 202 in the synchronization table 421. According to an embodiment, each of the plurality of electronic devices 220 may receive the update information of the synchronization table 421 from the server 230 and then, based on the received information, change call logs stored therein. For example, the first electronic device 221, which is one of the plurality of electronic devices 220, may receive a push signal from the server 230 and then, based on the push signal, change the first call log 201 stored in the memory (e.g., 130 in FIG. 1) to the second call log 202.

According to an embodiment, after changing the call log stored therein based on the push signal received from the server 230, each of the plurality of electronic devices 220 may output a user interface (e.g., 302 in FIG. 3B) including a call log interface (e.g., 352 in FIG. 3B) based on the changed call log. For example, based on the changed call log, the electronic device 220 may change a symbol indicating the call processing result of the call log in the user interface 302.

At operation 641, when it is determined that the received call log 240 does not correlate with the plurality of call logs stored in the candidate table 422 of the memory 420, the server 230 may update the synchronization table 421 by newly storing the received call log 240 in the synchronization table 421.

At operation 642, the server 230 may transmit update information of the synchronization table 421 to the plurality of electronic devices 220. For example, the server 230 may transmit, to the electronic devices 220, information of the call log newly added to the synchronization table 421. According to an embodiment, each of the plurality of electronic devices 220 may receive the update information of the synchronization table 421 from the server 230 and then, based on the received information, change call logs stored therein. For example, the second electronic device 222, which is one of the plurality of electronic devices 220, may receive a push signal from the server 230 and then, based on the push signal, newly store the first call log 201 in the memory (e.g., 130 in FIG. 1).

According to an embodiment, after newly storing the call log therein based on the push signal received from the server 230, each of the plurality of electronic devices 220 may output a user interface based on the newly stored call log. For example, based on the newly stored call log, the electronic device 220 may further display the newly stored call log.

Figure 7:
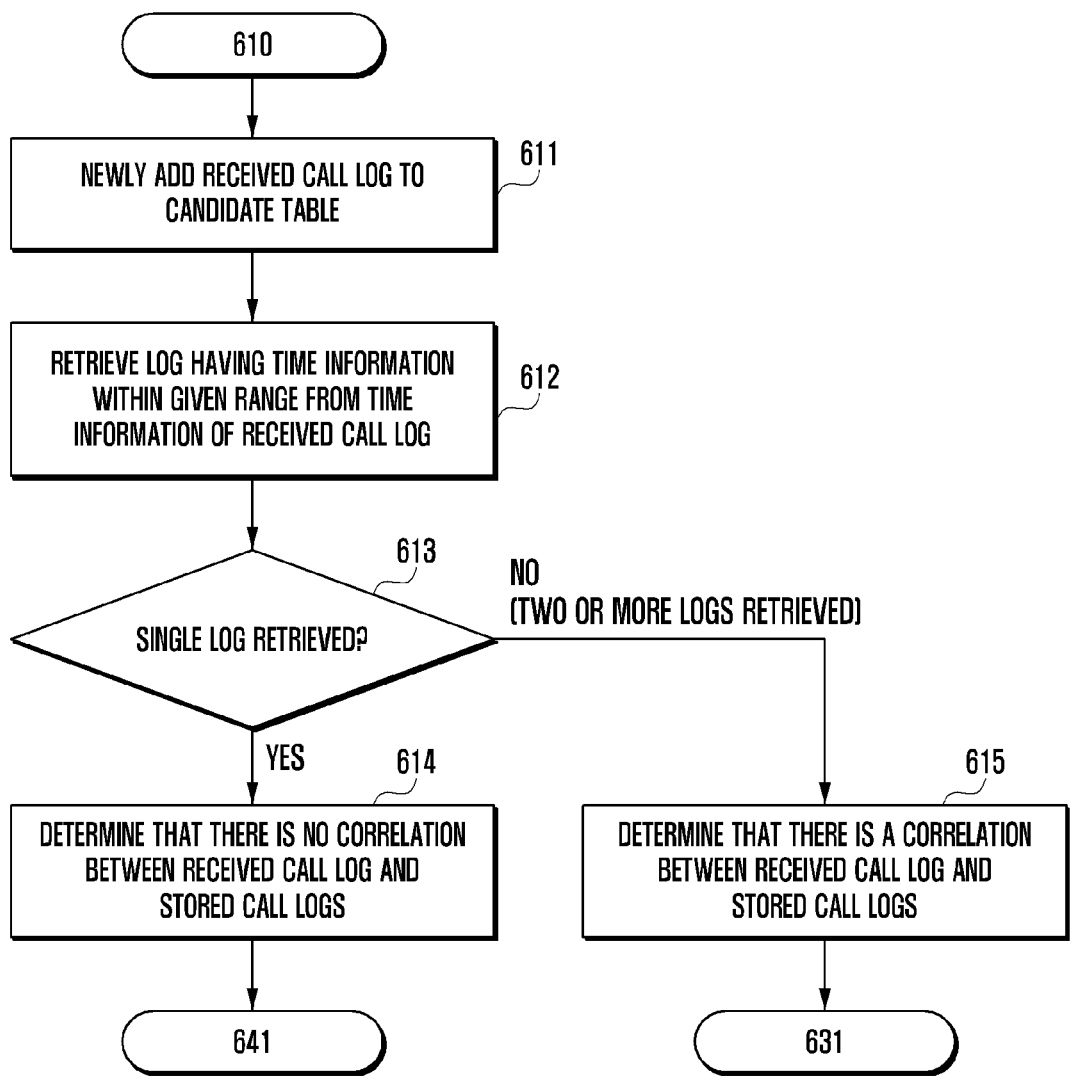
FIG. 7 is a flow diagram illustrating a method for determining a correlation between call logs.

FIG. 7 is a flow diagram illustrating a method for determining a correlation between call logs. Specifically, FIG. 7 shows a detailed embodiment of the above-described operation 620 in FIG. 6.

At operation 611, a server (e.g., 230 in FIG. 2) according to an embodiment may newly add a call log (e.g., the plurality of call logs 240 in FIG. 2) received from an electronic device (e.g., the plurality of electronic devices 220 in FIG. 2) to a candidate table (e.g., 422 in FIG. 4). For example, the server 230 may receive, from the electronic device 220, a call log 240 having a call partner of "mom", time information of "7:47:00 pm", and a call processing result of "missed call", and then newly add the received call log 240 to the candidate table 422.

At operation 612, the server 230 may retrieve, from the candidate table 422, a call log having the same call partner as that of the received call log 240 and also having time information within a particular time range from time information of the received call log 240. For example, the server 230 may retrieve, from the candidate table 422, a call log having a call partner of "mom" and also having time information within 30 seconds from "7:47:00 pm". For example, a result based on this search condition may be as shown in Table 2 above.

At operation 613, the server 230 may determine whether only one call log is retrieved from the candidate table 422. According to an embodiment, checking the number of call logs retrieved from the candidate table 422 is to determine whether a call log satisfying the search condition exists in the candidate table 422 in addition to the call log 240 received from the electronic device 220. For example, a single call log retrieved from the candidate table 422 indicates that a call log satisfying the search condition in the candidate table 422 is only the call log 240 received from the electronic device 220. In addition, two or more call logs retrieved from the candidate table 422 indicate that a call log satisfying the search condition in the candidate table 422 exists in addition to the call log 240 received from the electronic device 220.

When only one call log is retrieved from the candidate table 422, the server 230 may determine, at operation 614, that there is no correlation between the call log 240 received from the electronic device 220 and a plurality of call logs previously stored in the memory 420.

When two or more call logs are retrieved from the candidate table 422, the server 230 may determine, at operation 615, that there is a correlation between the call log 240 received from the electronic device 220 and a plurality of call logs previously stored in the memory 420.

Figure 8A:
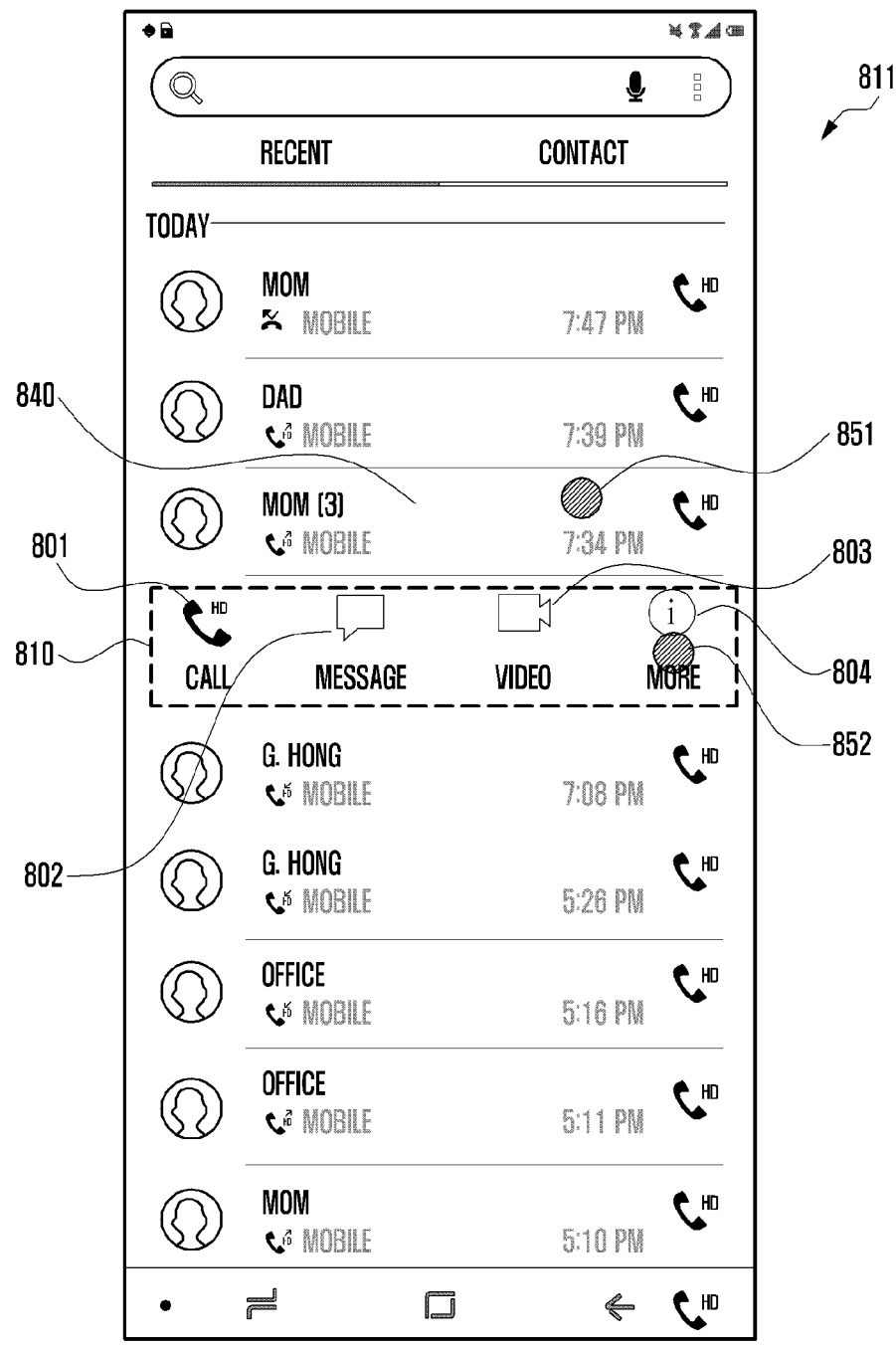
FIGS. 8A and 8B are screenshots showing another example of a user interface for displaying call logs.
Figure 8B:
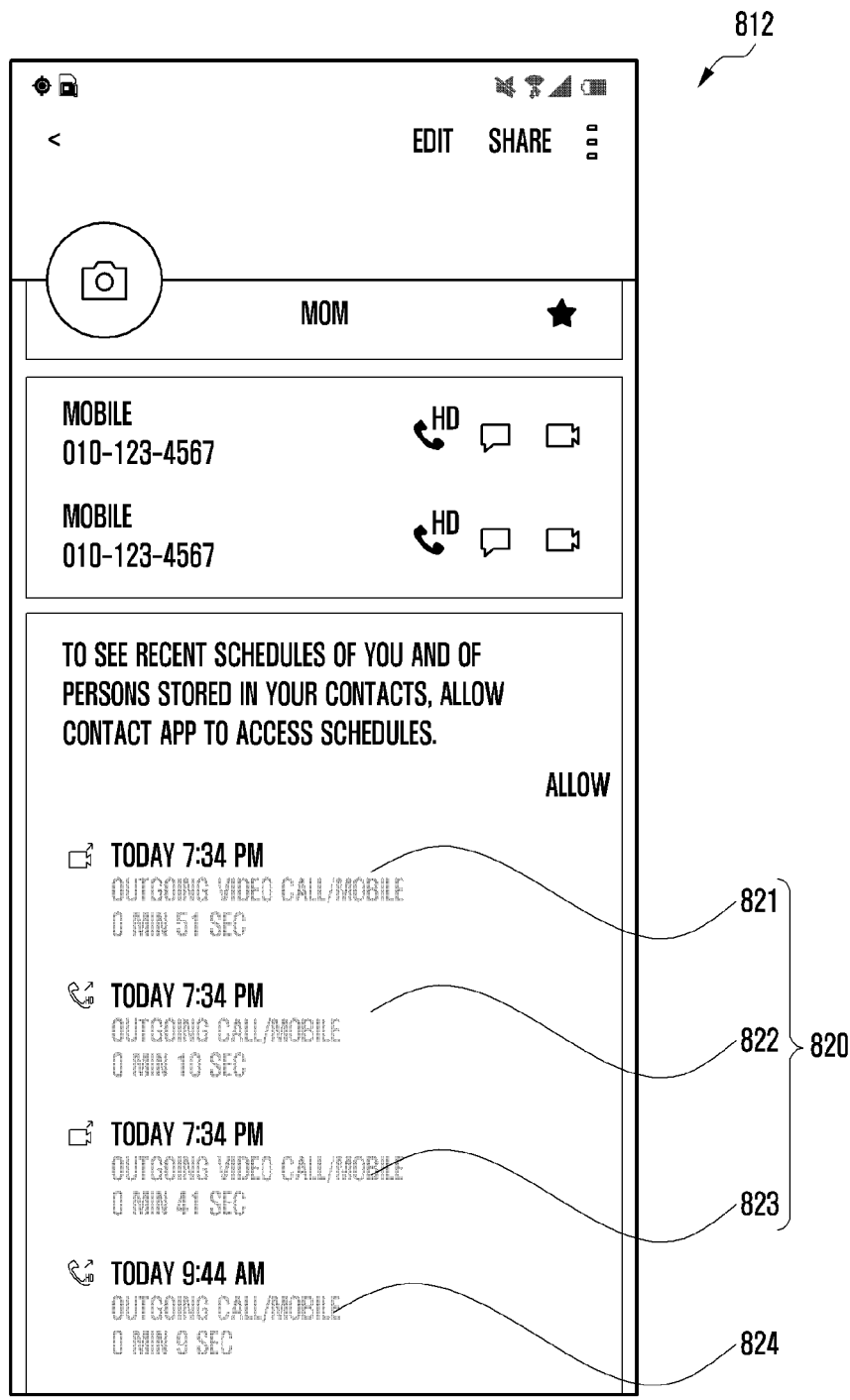

FIGS. 8A and 8B are screenshots showing another example of a user interface for displaying call logs.

The electronic device 220 according to various embodiments may provide a conversion call function for converting a video call into a voice call and vice versa. In addition, each of the electronic device 220 and the server 230 according to various embodiments may manage a call log in case of the conversion call function separately from a normal call log. In this disclosure, a call log associated with the conversion call function will be referred to as "conversion call log".

Hereinafter, a user interface (e.g., 811 in FIG. 8A, 812 in FIG. 8B) of the electronic device 220 that separately manages a conversion call log generated based on a conversion call between a video call and a voice call will be described.

Referring to FIG. 8A, the electronic device 220 may provide the user interface 811 that displays a call log stored in a memory (e.g., 130 in FIG. 1). In the illustrated example, the user interface 811 may be the same as or similar to the above-described user interfaces 301, 302, and 303 shown in FIGS. 3A to 3C. Thus, only a difference from the user interfaces 301, 302, and 303 shown in FIGS. 3A to 3C will be described hereinafter.

As shown, the user interface 811 may show a list of call log interfaces 840. According to an embodiment, in response to a user input 851 that selects any one call log interface 840 (e.g., the third call log interface from the top in FIG. 8A) from among the call log interfaces, the electronic device 220 may display a submenu 810 indicating functions associated with a call log corresponding to the selected call log interface 840.

According to an embodiment, the submenu 810 may include a plurality of icons 801, 802, 803, and 804 to which the functions associated with the call log corresponding to the selected call log interface 840 are mapped. For example, the submenu 810 may include a first icon 801 for making an outgoing call to a call partner (e.g., "mom" in FIG. 8A) of the selected call log interface 840, a second icon 802 for transmitting a message to the call partner, a third icon 803 for performing a video outgoing call to the call partner, and/or a fourth icon 804 for showing more information about the call log with the call partner.

According to an embodiment, in response to a user input 852 that selects the fourth icon 804, the electronic device 220 may display the second user interface 812 as shown in FIG. 8B. For example, the second user interface 812 may show detailed call log interfaces 812 and 820 with the call partner of the selected call log interface 840 as shown in FIG. 8B. According to an embodiment, the second user interface 812 may show not only a normal call log interface 824, but also show a conversion call log interface 820 in case where a user has switched between a video call and a voice call during a specific call. That is, the normal call log interface 824 indicates a call log other than the conversion call log interface 820. For example, the normal call log interface 824 may indicate a call log generated in case of a video call or a voice call.

According to the illustrated example, the second user interface of FIG. 8B shows detailed call logs when the call partner is "mom", including the conversion call log interface 820 indicating that the user made an outgoing call to the mother at "7:34 pm today" through a conversion call.

For example, when the user performs a conversion call, the electronic device 220 may generate three conversion call log interfaces 820 corresponding to the conversion call. Specifically, the conversion call log interfaces 820 may include a first conversion call log interface 821 representing the entire call log, a second conversion call log interface 822 representing a voice call log, and a third conversion call log interface 823 representing a video call log. According to an embodiment, when the conversion call is terminated, the electronic device 220 may transmit the conversion call logs generated in connection with the conversion call to the server 230. Then, the server 230 may store the conversion call logs received from the electronic device 220 in the synchronization table 421 and also deliver the conversion call logs to the other electronic device 220. According to an embodiment, the first to third conversion call logs generated based on the same conversion call may have the same device identification information and the same time information.

According to an embodiment, when the electronic device 220 sends the conversion call log to the server 230, the server 230 may have an algorithm for distinguishing the conversion call log from a normal call log.

Hereinafter, a method performed by the server 230 to distinguish a normal call log from a conversion call log generated through a switch between a video call and a voice call at the electronic device will be described with reference to FIG. 9.

Figure 9:
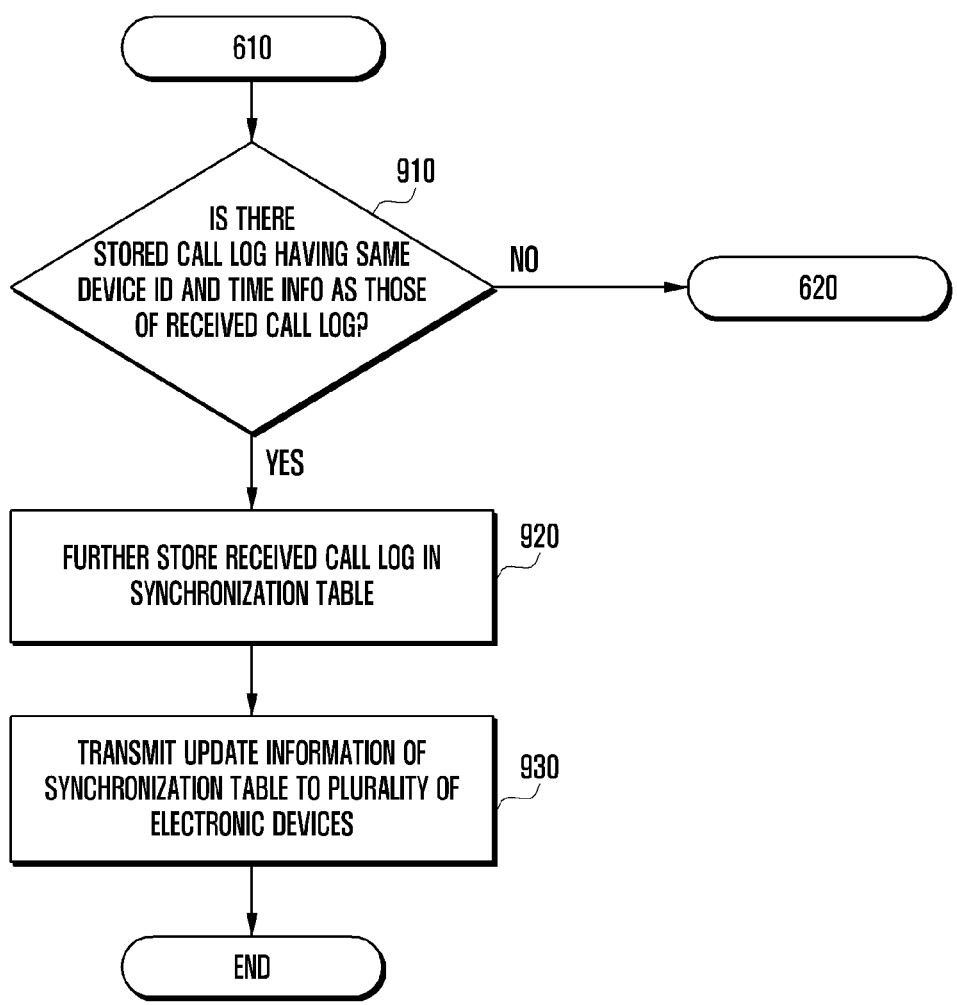
FIG. 9 is a flow diagram illustrating a method for distinguishing, at a server, a normal call log from conversion call logs generated through a switch between a video call and a voice call at an electronic device.

FIG. 9 is a flow diagram illustrating a method for distinguishing, at a server, a normal call log from conversion call logs generated through a switch between a video call and a voice call at an electronic device. Specifically, FIG. 9 shows an operational algorithm of a server (e.g., 230 in FIG. 2) performed between operations 610 and 620 shown in FIG. 6.

At operation 910, the server 230 may determine whether a call log having the same device identification information and time information as those of the call log 240 received from the electronic device 220 is stored in a table (e.g., the candidate table 422 in FIG. 4) of the memory 420. For example, the server 230 may retrieve a call log having the same device identification information and time information as those of the call log 240 received from the electronic device 220 from the candidate table 422 and thereby determine whether the received call log 240 is a conversion call log. If the same call log is retrieved from the candidate table 422, the received call log 240 and the retrieved call log may be call logs generated through the same conversion call. For example, each of the received call log 240 and the retrieved call log may be any one of the first conversion call log (e.g., 821 in FIG. 8B), the second conversion call log (e.g., 822 in FIG. 8B), and the third conversion call log (e.g., 823 in FIG. 8B).

When there is a call log having the same device identification information and time information as those of the call log 240 received from the electronic device 220 among call logs stored in the candidate table 422 of the memory 420, the server 230 may further store the received call log 240 in the synchronization table 421 at operation 920. By doing so, the server 230 may individually store all of the conversion call logs (e.g., the first, second, and third conversion call log interfaces 821, 822, and 823) generated based on the same conversion call and thereby update the synchronization table 421. Then, all the individually stored conversion call logs may be delivered to the plurality of electronic devices 220.

According to another embodiment, even if any call log having the same device identification information and time information as those of the received call log 240 is found in the candidate table 422, the server 230 may not store the received call log 240 in the candidate table 422. The reason is that another call log based on the same conversion call may have been already stored in the candidate table 422, and is to prevent the conversion call log from being repeatedly stored in the candidate table 422.

According to an embodiment, there is no call log having the same device identification information and time information as those of the call log 240 received from the electronic device 220 among call logs stored in the candidate table 422 of the memory 420, the server 230 may perform the above-described operation 620 shown in FIG. 6.

At operation 930, the server 230 may transmit update information of the synchronization table 421 to the plurality of electronic devices 220. For example, the server 230 may transmit the conversion call log further stored in the synchronization table 421 to the plurality of electronic devices 220. According to an embodiment, each electronic device 220 may receive the update information of the synchronization table 421 from the server 230 and then, based on the received update information, change the call log stored in the memory 130 thereof. For example, each electronic device 220 may receive the conversion call log as the update information of the synchronization table 421 from the server 230 and then further store the received conversion call log in the memory 130.

According to an embodiment, the plurality of electronic devices 220 may newly store the conversion call log in the memory 130, based on a push signal received from the server, and output a user interface (e.g., 812 in FIG. 8B) based on the newly stored conversion call log.

FIG. 10 is a flow diagram illustrating operations of overall components in a system according to an embodiment of the disclosure.

Referring to FIG. 10, the system according to an embodiment may include a first electronic device 1051 (e.g., the first electronic device 221 or the third electronic device 223 in FIG. 2), a second electronic device 1052 (e.g., the second electronic device 222 in FIG. 2), a server 1053 (e.g., the server 230 in FIG. 2), and/or a push server 1054.

At operations 1001 and 1002, the first and second electronic devices 1051 and 1052 may receive a call request from a mobile operator (e.g., 210 in FIG. 2). For example, each of the first and second electronic devices 1051 and 1052 may receive the call request via a single shared phone number. According to an embodiment, each of the first and second electronic devices 1051 and 1052 may output a notification associated with the call request in response to the call request received from the mobile operator 210. For example, each of the first and second electronic devices 1051 and 1052 may output a ring tone or a vibration as the notification. In another example, each of the first and second electronic devices 1051 and 1052 may control a display (e.g., the display device 160 in FIG. 1) to output a user interface that represents the reception of the call request.

At operation 1003, the second electronic device 1052 may provide a call function for the received call request, based on a user input, and the first electronic device 1051 may determine a missed call when the reception of the call request is stopped from the mobile operator 210. For example, the call functionality provided by the second electronic device 1052 may include a voice call, a video call, and/or a conversion call to switch between a voice call and a video call.

According to a certain embodiment, the mobile operator 210 may transmit code information to the first electronic device 1051 when stopping the transmission of the call request to the first electronic device 1051. For example, the code information transmitted to the first electronic device 1051 by the mobile operator 210 may be "a call answer of other device (i.e., answered_externally)" or "a call rejection of other device (i.e., rejected_externally)". In this case, based on the received code information, the first electronic device 1051 may recognize a state where any other device has answered the call request or has rejected the call request.

At operation 1004, the first electronic device 1051 determining a missed call may transmit a first call log to the server 1053. For example, the first call log may contain a missed call as a call processing result. According to a certain embodiment, when receiving code information from the mobile operator 210, the first electronic device 1051 may transmit the first call log based on the code information to the server 1053. For example, based on the code information, the first electronic device 1051 may transmit, to the server 1053, the second call log that contains "a call answer of other device (i.e., answered_externally)" or "a call rejection of other device (i.e., rejected_externally)" as the call processing result.

At operation 1005, the server 1053 may transmit a first response signal to the first electronic device 1051 in response to receiving the first call log from the first electronic device 1051. According to an embodiment, based on the first response signal, the first electronic device 1051 may store the first call log in the memory 130 thereof and display the first call log through a user interface.

According to an embodiment, the server 1053 may perform at least some of the operations shown in FIGS. 6, 7, and 9 in response to receiving the first call log from the first electronic device 1051.

At operations 1006 and 1007, the server 1053 may deliver the first call log to the push server 1054 in response to receiving the first call log from the first electronic device 1051, and then the push server 1054 may transmit the received first call log to another electronic device, e.g., the second electronic device 1052, that shares a phone number. According to an embodiment, in response to receiving a call log of another device, e.g., the first call log, from the push server 1054 or the server 1053, the second electronic device 1052 may temporarily store the first call log in a memory (e.g., 130 in FIG. 1). According to a certain embodiment, the second electronic device 1052 may output a notification indicating the reception of the first call log. For example, the second electronic device 1052 may receive the first call log while providing a call function, and then output such a notification in the form of a pop-up window on a user interface associated with the call function for a given time (e.g., 3 seconds). According to an embodiment, displaying the pop-up window as the notification may be omitted.

When the call function is terminated at operation 1008, the second electronic device 1052 may transmit a second call log to the server 1053 at operation 1009. For example, the second call log may indicate a call answer as the call processing result. According to a certain embodiment, when the user performs a conversion call via the second electronic device 1052, the second call log may contain conversion call logs including first conversion call log, a second conversion call log, and a third conversion call log.

At operation 1010, the server 1053 may perform at least some of the operations shown in FIGS. 6, 7, and 9 in response to receiving the second call log from the second electronic device 1052. For example, the server 1053 may determine a correlation between the second call log and the stored first call log and then, based on the determined correlation, merge the first and second call logs. In the illustrated example, because the call processing results of the first and second call logs are a missed call and a call answer, respectively, the server 1053 may merge the first and second call logs into the second call log, based on the second call log having the call processing result of higher priority. Then, the server 1053 may store the merged second call log in a synchronization table (e.g., 421 in FIG. 4) of a memory (e.g., 420 in FIG. 4) to update the synchronization table 421.

At operation 1011, the server 1053 may transmit a second response signal to the second electronic device 1052 in response to receiving the second call log from the second electronic device 1052. Then, at operation 1012, the second electronic device 1052 may update the call log of the memory 130 by storing the second call log in the memory 130 based on the second response signal, and also display the second call log through the user interface.

At operation 1013, the server 1053 may deliver the second call log to the push server 1054 as update information of the synchronization table 421. Then, at operation 1014, the push server 1054 may transmit the second call log to another electronic device, e.g., the first electronic device 1051, which shares a phone number.

At operation 1015, the first electronic device 1051 may update the call log stored in the memory 130 in response to receiving the second call log as update information of the synchronization table 421 from the server 1053. For example, the first electronic device 1051 may change the first call log stored in the memory 130 to the second call log and also change the first call log displayed through the user interface to the second call log.

FIG. 11 is a flow diagram illustrating operations of a server according to an embodiment of the disclosure.

Referring to FIG. 11, a server 1160 (e.g., the server 230 in FIG. 2) according to an embodiment may include a processor 1161 (e.g., the processor 410 in FIG. 4), a candidate table 1162 (e.g., the candidate table 422 in FIG. 4), and/or a synchronization table 1163 (e.g., the synchronization table 421 in FIG. 4). The server 1160 may perform the following operations in response to receiving a call log (e.g., 240 in FIG. 2) from a certain electronic device 1151 (e.g., one of the first to third electronic devices 221, 222, and 223 in FIG. 2) that shares a phone number with other electronic devices.

At operation 1101, the processor 1161 may receive the call log 240 from the electronic device 1151 that shares a phone number with any other electronic device. For example, the call log 240 may be a call log associated with an incoming call of the electronic device 1151 or a call log associated with an outgoing call of the electronic device 1151.

According to an embodiment, the call log transmitted by the electronic device 1151 may contain any one of call processing results including "a missed call", "a call answer", "a user's call rejection", "an automatic call rejection", "a call answer of other electronic device", or "a call rejection of other electronic device".

According to an embodiment, the call log transmitted by the electronic device 1151 may be a conversion call log including any one of first, second, and third conversion call logs.

At operation 1102, the processor 1161 may determine whether the call log 240 received from the electronic device 1151 is a conversion call log. According to an embodiment, the processor 1161 may determine whether there is a call log having the same device identification information and time information as those of the call log 240 received from the electronic device 220 among call logs stored in the candidate table 1162. The operation 1102 of the processor 1161 may be similar to the above-described operation 910 shown in FIG. 9, so that a detailed description of the operation 1102 will be omitted.

According to an embodiment, when there is a call log having the same device identification information and time information as those of the call log 240 received from the electronic device 220 among call logs stored in the candidate table 1162, the processor 1161 may perform operations 1103 and 1104 and then terminate the process. For example, when there are a plurality of call logs retrieved from the candidate table 1162, the processor 1161 may perform operations 1103 and 1104 and terminate the process.

According to an embodiment, when there is no call log having the same device identification information and time information as those of the call log 240 received from the electronic device 220 among call logs stored in the candidate table 1162, the processor 1161 may perform operations 1105 to 1111. For example, when a call log retrieved from the candidate table 1162 is only the call log 240 received from the electronic device 1151, the processor 1161 may perform operations 1105 to 1111.

At operation 1103, the processor 1161 may newly store the call log 240 received from the electronic device 1151 in the synchronization table 1163. According to an embodiment, the processor 1161 may not store the received call log 240 in the candidate table 1162. According to an embodiment, the operation 1103 of the processor 1161 may be similar to the above-described operation 920 shown in FIG. 9, so that a detailed description of the operation 1103 will be omitted.

At operation 1104, the processor 1161 may transmit update information of the synchronization table 1163 to the electronic devices 1151 (e.g., the plurality of electronic devices 220 in FIG. 2) that share a phone number. According to an embodiment, the operation 1104 of the processor 1161 may be similar to the above-described operation 930 shown in FIG. 9, so that a detailed description of the operation 1104 will be omitted.

At operation 1105, the processor 1161 may newly store the call log 240 received from the electronic device 1151 in the candidate table 1162. According to an embodiment, the operation 1105 of the processor 1161 may be similar to the above-described operation 611 shown in FIG. 7, so that a detailed description of the operation 1105 will be omitted.

At operation 1106, the processor 1161 may retrieve, from the candidate table 1162, a call log having the same call partner and also having time information within a particular time range from time information of the received call log 240. According to an embodiment, the operation 1106 of the processor 1161 may be similar to the above-described operation 612 shown in FIG. 7, so that a detailed description of the operation 1106 will be omitted.

According to an embodiment, when only one call log is retrieved from the candidate table 1162 at operation 1106, the processor 1161 may perform operations 1107 and 1108.

According to an embodiment, when two or more call logs are retrieved from the candidate table 1162 at operation 1106, the processor 1161 may perform operations 1109 to 1111.

At operation 1107, based on determining that the candidate table 1162 does not contain any call log that correlates with the call log 240 received from the electronic device 1151, the processor 1161 may newly store the received call log 240 in the synchronization table 1163. According to an embodiment, the operation 1107 of the processor 1161 may be similar to the above-described operation 614 shown in FIG. 7, so that a detailed description of the operation 1107 will be omitted.

At operation 1108, the processor 1161 may transmit update information of the synchronization table 1163 to the electronic devices 1151 (e.g., the plurality of electronic devices 220 in FIG. 2) that share a phone number. According to an embodiment, the operation 1108 of the processor 1161 may be similar to the above-described operation 642 shown in FIG. 6, so that a detailed description of the operation 1108 will be omitted.

At operation 1109, the processor 1161 may merge the call log 240 received from the electronic device 1151 with the call log retrieved from the candidate table 1162, based on a predefined condition.

At operation 1110, the processor 1161 may update the call logs stored in the synchronization table 1163, based on the merged call log.

According to an embodiment, the operations 1109 and 1110 of the processor 1161 may be similar to the above-described operation 631 shown in FIG. 6, so that a detailed description of the operations 1109 and 1110 will be omitted.

At operation 1111, the processor 1161 may transmit update information of the synchronization table 1163 to the electronic devices 1151 (e.g., the plurality of electronic devices 220 in FIG. 2) that share a phone number. According to an embodiment, the operation 1111 of the processor 1161 may be similar to the above-described operation 632 shown in FIG. 6, so that a detailed description of the operation 1111 will be omitted.

According to a certain embodiment, the function or operation of the server 1160 shown in FIG. 11 may be performed by any one (e.g., the second electronic device 222 in FIG. 2) of a plurality of electronic devices (e.g., 220 in FIG. 2) that share a phone number with each other. In this case, the plurality of electronic devices 220 sharing a phone number may be classified into one main electronic device (e.g., the second electronic device 222 in FIG. 2) and one or more sub electronic devices (e.g., the first and third electronic devices 221 and 223 in FIG. 2). According to an embodiment, the main electronic device 222 and the sub electronic devices 221 and 223 may be connected via a short range communication and thereby exchange the call log 240 and the push signal. According to an embodiment, the short range communication may be, for example, a Bluetooth communication.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1$^{st}$" and "2$^{nd}$", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been particularly shown and described with reference to various embodiments thereof, it will be understood by those skilled in the art that various changes in form and details may be made therein without departing from the scope of the subject matter as defined by the appended claims.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device configured to share a single phone number with an external device, the electronic device comprising:
   a display;
   a communication circuit;
   a processor operatively connected to the display and the communication circuit; and
   a memory operatively connected to the processor, configured to store a plurality of call logs, wherein the plurality of call logs includes at least one conversion call log, and storing instructions that, when executed by the processor, cause the processor to:
      control the communication circuit to receive a call request via the phone number,
      control the communication circuit to transmit a first call log associated with a missed call to a server in response to a stopped reception of the call request,
      control the communication circuit to receive a first response signal regarding transmission of the first call log from the server,
      store the first call log in the memory based on the first response signal,
      control the communication circuit to receive a push signal from the server, wherein the push signal is generated by the server based on a second call log received from the external device and generated by the external device based on the call request,
      update the first call log stored in the memory based on the push signal,
      when the second call log is of a conversion call log type, display, through the display, a first user interface comprising a conversion call log interface, and
      when the second call log is not of the conversion call log type, display, through the display, a second user interface comprising a call log interface,
      wherein a conversion call comprises a call containing at least one switch between voice only and video communication, and
      wherein a call log of the conversion call log type comprises data of a voice portion of the conversion call and data of a video portion of the conversion call.

2. The electronic device of claim 1, wherein the second call log contains one of call processing results including a call answer, a user's call rejection, an automatic call rejection, a call answer by the external device, and a call rejection by the external device.

3. The electronic device of claim 1, wherein the memory further stores instructions that, when executed by the processor, cause the processor to:
   change a symbol associated with a call processing result contained in the call log interface to a symbol corresponding to the second call log based on a change from the first call log stored in the memory to the second call log.

4. The electronic device of claim 1, wherein the memory further stores instructions that, when executed by the processor, cause the processor to:
   provide a call function as a response to the call request based on a user input;
   transmit a third call log associated with a call answer to the server based on the call function being terminated;
   receive a second response signal regarding transmission of the third call log from the server; and
   change the first call log stored in the memory to the third call log, based on the second response signal.

5. The electronic device of claim 4, wherein the memory further stores instructions that, when executed by the processor, cause the processor to:
   change a symbol associated with a call processing result contained in the call log interface to a symbol corresponding to the third call log based on a change from the first call log stored in the memory to the third call log.

6. A server for synchronizing call logs of a plurality of electronic devices configured to share a single phone number, the server comprising:
   a memory including a table storing a plurality of call logs, wherein the table includes a synchronization table and a candidate table; and
   a processor configured to:
      receive a call log associated with the phone number from one of a plurality of electronic devices,
      determine whether the received call log is of a conversion call log type,
      responsive to the received call log being of the conversion call log type, store the received call log in the synchronization table to update the stored call logs of the table,
      responsive to the received call log not being of the conversion call log type, determine whether the received call log correlates to the plurality of call logs stored in the table,
      responsive to the received call log correlating to the plurality of call logs stored in the table, merge the received call log with the stored call logs of the table based on a predefined condition to update the stored call logs of the table based on a merge result,
      responsive to the received call log not correlating to the plurality of call logs stored in the table, store the received call log in the candidate table to update the stored call logs of the table, and
      transmit an update result of the table to the plurality of electronic devices,
      wherein a conversion call comprises a call containing at least one switch between voice only and video communication, and
      wherein a call log of the conversion call log type comprises data of a voice portion of the conversion call and data of a video portion of the conversion call.

7. The server of claim 6, wherein:
   each of the plurality of call logs contains device identification information, call partner information, time information, or a call processing result, and
      based on a call log including (i) the same call partner information as the call partner information of the received call log and (ii) time information within a particular time range from the time information of the received call log exists in the table, the processor is configured to determine that the received call log correlates to the plurality of call logs stored in the table.

8. The server of claim 7, wherein the processor is further configured to:
retrieve, from a candidate table, a call log including (i) the same device identification information as the device identification information of the received call log and (ii) the same time information as the time information of the received call log, as a second predefined search condition,
add the received call log to the synchronization table to update the plurality of call logs stored in the synchronization table based on a call log satisfying the second predefined search condition being retrieved from the candidate table, and
transmit update information of the synchronization table to the plurality of electronic devices.

9. The server of claim 8, wherein the processor is further configured to determine whether the received call log correlates to the plurality of call logs stored in the table based on a call log satisfying the second predefined search condition not being retrieved from the candidate table.

10. The server of claim 7, wherein the call processing result includes a missed call, a call answer, a user's call rejection, an automatic call rejection, a call answer by an external device, and a call rejection by the external device.

11. The server of claim 7, wherein:
to determine whether the received call log correlates to the plurality of call logs stored in the table, the processor is further configured to:
add the received call log to the candidate table,
retrieve, from the candidate table, a call log including (i) the same call partner information as the call partner information of the received call log and (ii) time information within a particular time range from the time information of the received call log, as a first predefined search condition,
determine that the received call log correlates to the plurality of call logs stored in the table based on two or more call logs being retrieved from the candidate table, or
determine that the received call log does not correlate to the plurality of call logs stored in the table based on only one call log being retrieved from the candidate table.

12. The server of claim 11, wherein the processor is further configured to:
compare the call processing results of the retrieved call logs, based on predefined priorities, based on two or more call logs being retrieved from the candidate table, based on the first predefined search condition,
determine a specific call log that includes a call processing result of a higher priority among the retrieved call logs based on a comparison result,
update the synchronization table based on the determined specific call log, and control to transmit update information of the synchronization table to the plurality of electronic devices.

13. The server of claim 12, wherein a call answer or a user's call rejection is the call processing result having the highest priority.

14. The server of claim 12, wherein the processor is further configured to transmit update information of the synchronization table to the plurality of electronic devices through a push server.

15. The server of claim 11, wherein the processor is further configured to:
newly add the received call log to the synchronization table to update the plurality of call logs stored in the synchronization table, based on predefined priorities, when only one call log is retrieved from the candidate table, based on the first predefined search condition, and
control to transmit update information of the synchronization table to the plurality of electronic devices.

16. An operating method of an electronic device configured to share a single phone number with an external device, the method comprising:
receiving a call request via the phone number;
transmitting a first call log associated with a missed call to a server in response to a stopped reception of the call request;
receiving a first response signal regarding transmission of the first call log from the server;
storing the first call log in a memory of the electronic device based on the first response signal;
receiving a push signal from the server, wherein the push signal is generated by the server based on a second call log received from the external device and generated by the external device based on the call request;
changing the first call log stored in the memory to the second call log based on the push signal;
when the second call log is of a conversion call log type, displaying, through the display, a first user interface comprising a conversion call log interface; and
when the second call log is not of the conversion call log type, displaying, through the display, a second user interface comprising a call log interface,
wherein a conversion call comprises a call containing at least one switch between voice only and video communication, and
wherein a call log of the conversion call log type comprises data of a voice portion of the conversion call and data of a video portion of the conversion call.

17. The method of claim 16, wherein the second call log contains one of call processing results including a call answer, a user's call rejection, an automatic call rejection, a call answer by the external device, and a call rejection by the external device.

18. The method of claim 16, further comprising:
providing a call function as a response to the call request based on a user input;
transmitting a third call log associated with a call answer to the server when the call function is terminated;
receiving a second response signal regarding transmission of the third call log from the server; and
changing the first call log stored in the memory to the third call log based on the second response signal.

19. The method of claim 16, further comprising:
changing a symbol associated with a call processing result contained in the call log interface to a symbol corresponding to the second call log based on a change from the first call log stored in the memory to the second call log.

20. The method of claim 18, further comprising:
changing a symbol associated with a call processing result contained in the call log interface to a symbol corresponding to the third call log, based on a change from the first call log stored in the memory to the third call log.

* * * * *